US 8,244,617 B2

(12) United States Patent
Lutnick et al.

(10) Patent No.: US 8,244,617 B2
(45) Date of Patent: Aug. 14, 2012

(54) CASH FLOW RATING SYSTEM

(75) Inventors: Howard W. Lutnick, New York, NY (US); Dean P. Alderucci, New York, NY (US); Michael Sweeting, London (GB); Thomas D. Bradshaw, New York, NY (US)

(73) Assignee: CFPH, LLC, New York, NY (US)

( * ) Notice: Subject to any disclaimer, the term of this patent is extended or adjusted under 35 U.S.C. 154(b) by 365 days.

(21) Appl. No.: 12/426,314

(22) Filed: Apr. 20, 2009

(65) Prior Publication Data

US 2010/0268665 A1  Oct. 21, 2010

(51) Int. Cl.
*G06Q 40/00* (2012.01)
(52) U.S. Cl. ............ 705/36 R; 705/35; 705/37; 705/38; 705/40
(58) Field of Classification Search .............. 705/36 R, 705/37, 38
See application file for complete search history.

(56) References Cited

U.S. PATENT DOCUMENTS

| | | | |
|---|---|---|---|
| 5,812,988 A * | 9/1998 | Sandretto | 705/36 R |
| 2002/0019789 A1 * | 2/2002 | Ginsberg | 705/36 |
| 2002/0049653 A1 * | 4/2002 | Johnson et al. | 705/35 |
| 2003/0018563 A1 * | 1/2003 | Kilgour et al. | 705/37 |
| 2003/0033229 A1 | 2/2003 | Keyes et al. | |
| 2003/0105708 A1 * | 6/2003 | Lee | 705/38 |
| 2003/0135450 A1 * | 7/2003 | Aguais et al. | 705/38 |
| 2003/0229558 A1 * | 12/2003 | Kobayashi et al. | 705/36 |
| 2004/0128227 A1 * | 7/2004 | Whipple et al. | 705/38 |
| 2004/0158520 A1 * | 8/2004 | Noh | 705/38 |
| 2004/0205008 A1 * | 10/2004 | Haynie et al. | 705/31 |
| 2004/0267647 A1 * | 12/2004 | Brisbois | 705/35 |
| 2005/0144119 A1 * | 6/2005 | Monsen et al. | 705/38 |
| 2005/0187851 A1 * | 8/2005 | Sant | 705/36 |
| 2005/0273429 A1 * | 12/2005 | Deckoff | 705/40 |
| 2006/0015425 A1 * | 1/2006 | Brooks | 705/35 |
| 2006/0095355 A1 * | 5/2006 | Mayers et al. | 705/35 |
| 2007/0033123 A1 * | 2/2007 | Navin | 705/35 |
| 2007/0168272 A1 * | 7/2007 | Eimbinder | 705/36 R |
| 2007/0255655 A1 * | 11/2007 | Kemper et al. | 705/39 |
| 2007/0294156 A1 * | 12/2007 | Hughes et al. | 705/36 R |
| 2008/0021804 A1 | 1/2008 | Deckoff | |
| 2008/0126267 A1 * | 5/2008 | Rosen et al. | 705/36 R |
| 2008/0133427 A1 * | 6/2008 | Watson et al. | 705/36 R |
| 2008/0177673 A1 * | 7/2008 | Ahn et al. | 705/36 R |

(Continued)

OTHER PUBLICATIONS

Cash flows reflected in the rating of the economic entities; International Journal of Business Research, v9, n2; Mar. 2009; 8-pages.*

(Continued)

*Primary Examiner* — Gregory Johnson

(57) ABSTRACT

Methods and systems are provided herewith for rating a likelihood of payment of one or more cash flows. A computing device determines a probability of payment for one or more payments on a payment schedule for each of one or more debt instruments of a debt instrument portfolio. The computing device may also determine a portfolio cash flow rating of the debt instrument portfolio based on the quantity and purchase price associated with each of the one or more debt instruments, the probability of payment for the one or more payments, a current market price of each of the one or more debt instruments, a net present expected value of the one or more payments in the payment schedule for each of the one or more debt instruments, and/or a credit rating of one or more issuers associated with the debt instruments.

32 Claims, 10 Drawing Sheets

U.S. PATENT DOCUMENTS

2009/0024539 A1* 1/2009 Decker ............... 705/36 R
2010/0153296 A1* 6/2010 Volpert et al. ........... 705/36 R
2011/0016042 A1* 1/2011 Cho et al. ............ 705/38

OTHER PUBLICATIONS

Merchant Power: When Hedging and Profits Collide; Dunn, Andy; Public Utilities Fortnightly, v144n6; Jun 2006; 5-pages.*

Contingent payments and debt contracts; De, Sankar; Kale, Jayant R; Financial Management, v22n2; Summer 1993; 21-pages.*
PCT International Preliminary Examination Report and Written Opinion for PCT Application No. PCT/US2010/239481; Oct. 25, 2011; 8 pages.

* cited by examiner

FIG. 8

| User: John Doe; Account #12345; Portfolio #2 | Time Period(s): 3/31-10/31 2010 and 8/30-10/30 2011 |
|---|---|

Portfolio #2: Aggregate CR (A and B) = BBB

Debt Instrument A: AIG Bond ABC; Vol.=10,000; Purchase price=$2000; MktPrice=$1000

| Selected Payments | Discount Rate | Present Value | Likelihood of Payment | Expected Present Value | Cashflow Rating |
|---|---|---|---|---|---|
| $P2 on DA2 | Rate A2 | $PVA2 | 99% | $PVA2 * 99% | CRA2=AA |
| $P3 on DA3 | Rate A3 | $PVA3 | 98% | $PVA3 * 98% | CRA3=A |
| $P4 on DA4 | Rate A4 | $PVA4 | 96% | $PVA4 * 96% | CRA4=BB |
| $P5 on DA5 | Rate A5 | $PVA5 | 93% | $PVA5 * 93% | CRA5=B |
| $P8 on DA8 | Rate A8 | $PVA8 | 89% | $PVA8 * 89% | CRA8=CC |

Aggregate CR(A) = BB

Debt Instrument B: BofA Bond DEF; Vol.=5000; Purchase price=$300; MktPrice=$900

| Selected Payments | Discount Rate | Present Value | Likelihood of Payment | Expected Present Value | Cashflow Rating |
|---|---|---|---|---|---|
| $P1 on DB1 | Rate B1 | $PVB1 | 99% | $PVB1 * 99% | CRB1=AA |
| $P2 on DB2 | Rate B2 | $PVB2 | 99% | $PVB2 * 99% | CRB2=AA |
| $P3 on DB3 | Rate B3 | $PVB3 | 98% | $PVB3 * 98% | CRB3=A |

Aggregate CR(B) = AA

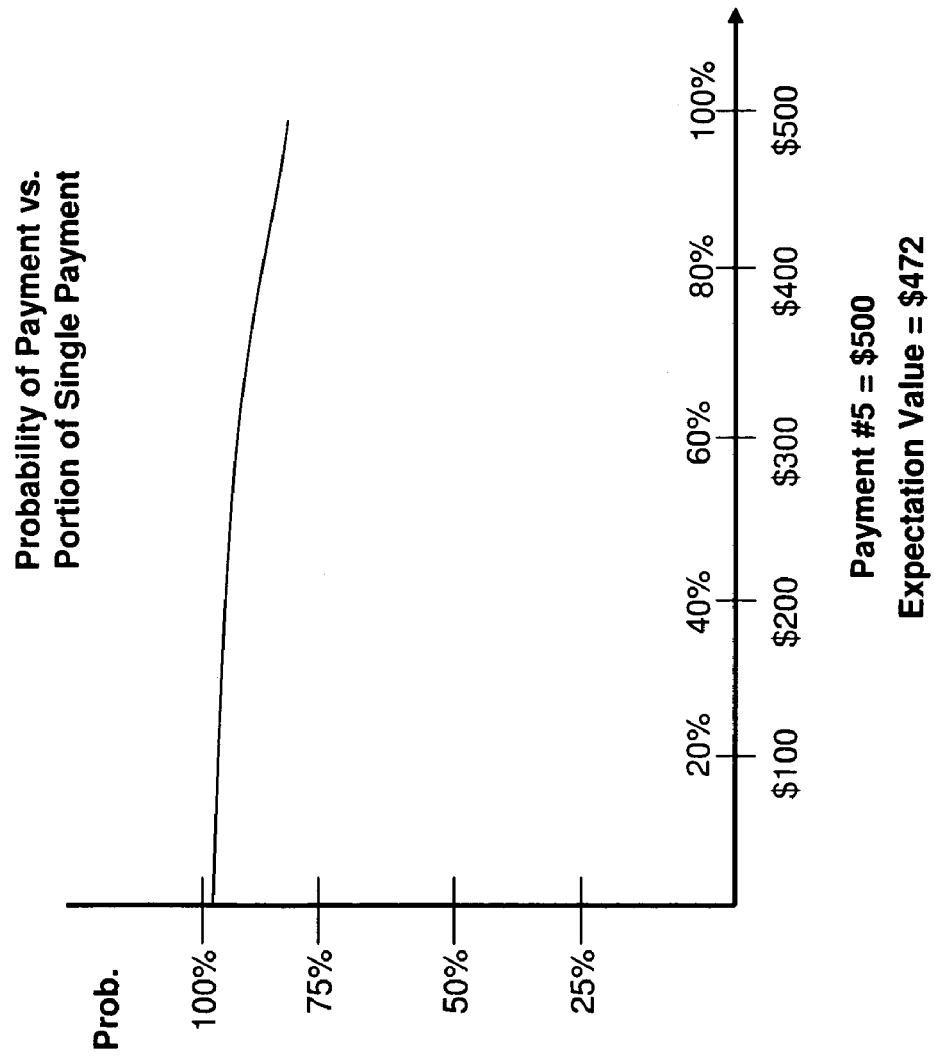

CASH FLOW RATING SYSTEM

BRIEF DESCRIPTION OF THE FIGURES

FIG. 8 depicts an exemplary interface showing information associated with a determination of a cash flow rating according to at least one embodiment of the invention disclosed herein.

FIG. 10 shows an exemplary diagram showing a probability of payment versus an amount of a single payment according to an exemplary embodiment of the invention.

DETAILED DESCRIPTION

Figure 1:
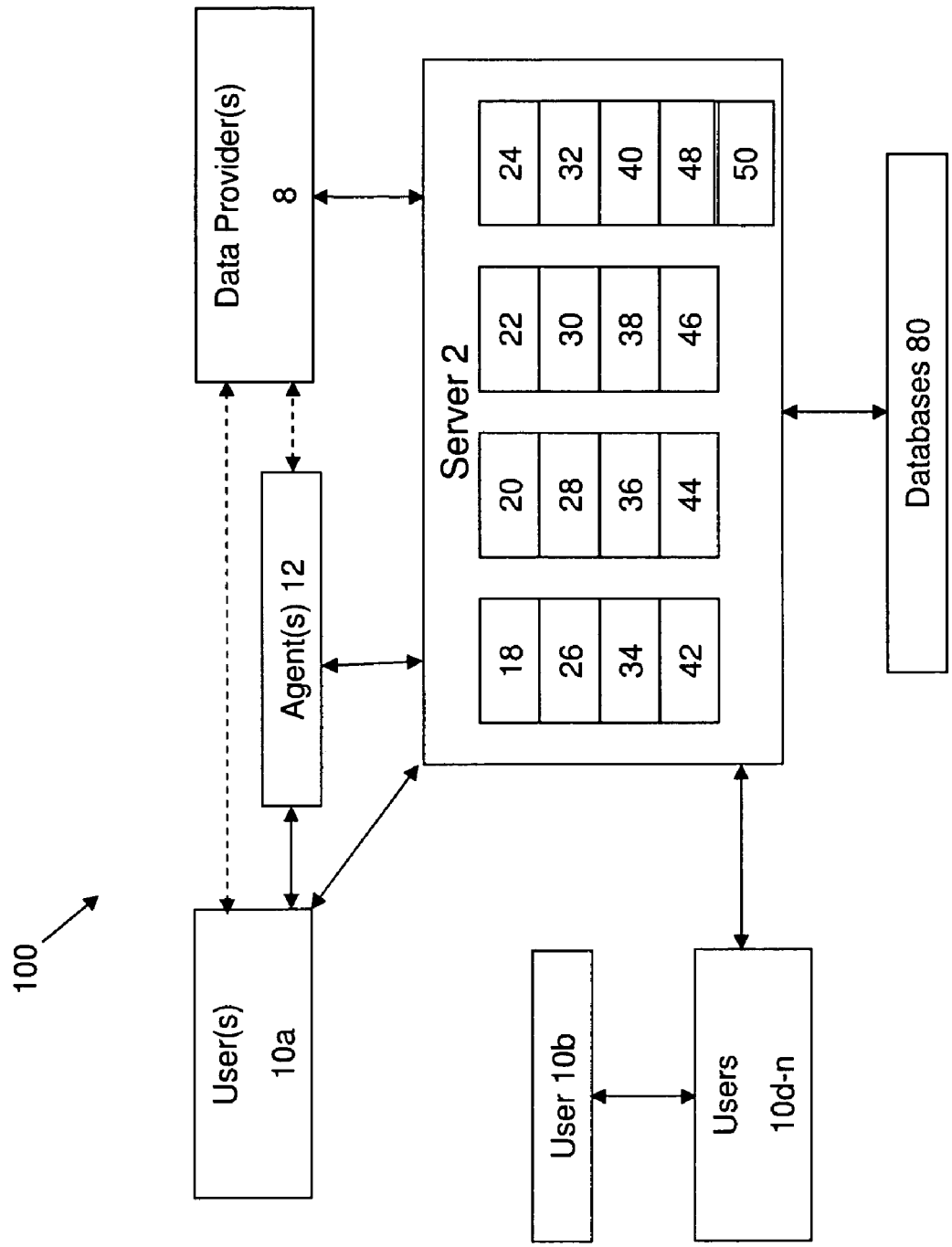
FIG. 1 depicts a system according to at least one embodiment of the systems disclosed herein.
Figure 2:
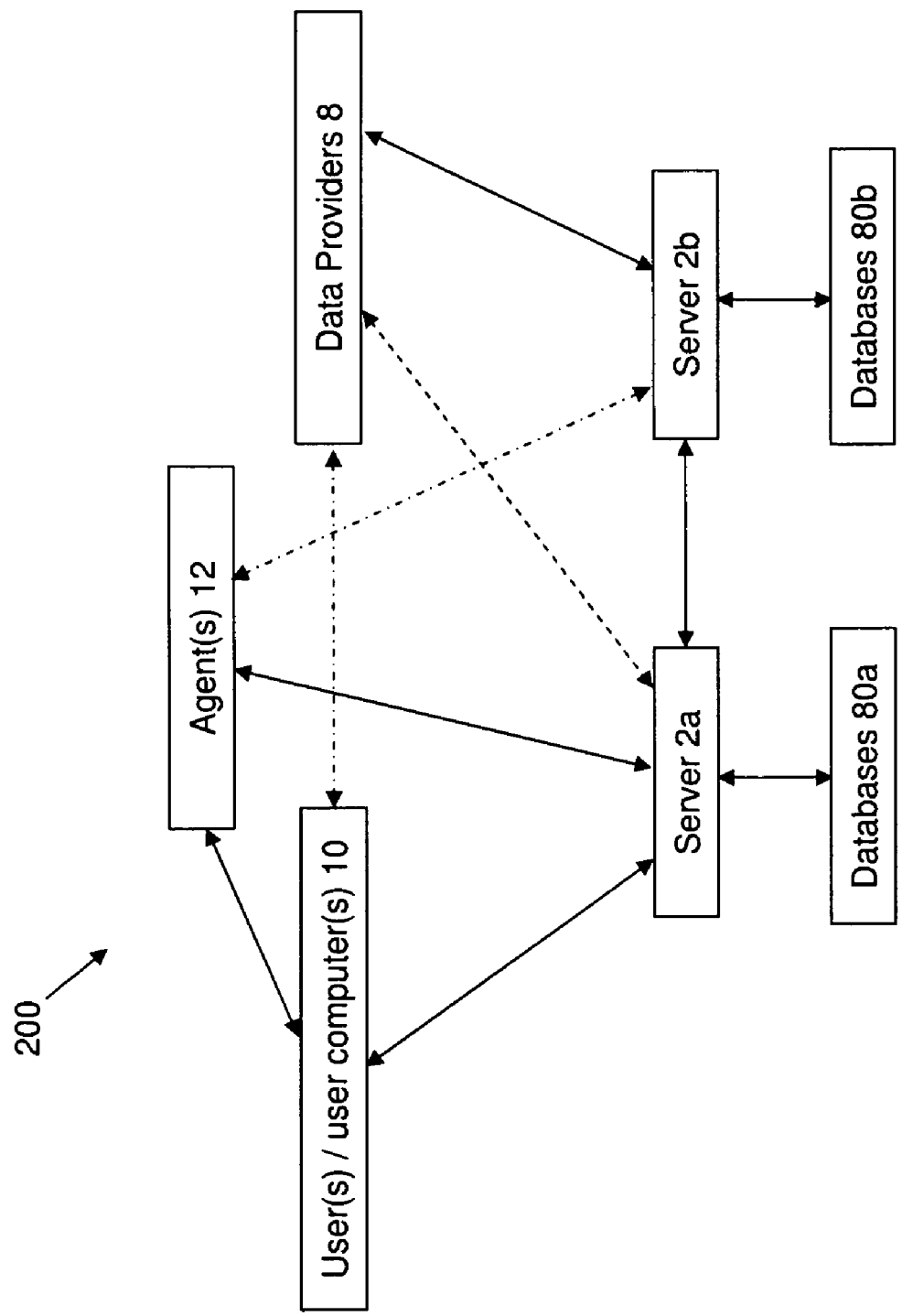
FIG. 2 depicts a system according to at least one embodiment of the systems disclosed herein.

The following sections I-XI provide a guide to interpreting the present application.

I. Terms

The term "product" means any machine, manufacture and/or composition of matter, unless expressly specified otherwise.

The term "process" means any process, algorithm, method or the like, unless expressly specified otherwise.

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

The term "invention" and the like mean "the one or more inventions disclosed in this application", unless expressly specified otherwise.

The terms "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the disclosed invention(s)", unless expressly specified otherwise.

The term "variation" of an invention means an embodiment of the invention, unless expressly specified otherwise.

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise.

The term "plurality" means "two or more", unless expressly specified otherwise.

The term "herein" means "in the present application, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase "at least one of a widget, a car and a wheel" means either (i) a widget, (ii) a car, (iii) a wheel, (iv) a widget and a car, (v) a widget and a wheel, (vi) a car and a wheel, or (vii) a widget, a car and a wheel. The phrase "at least one of", when such phrase modifies a plurality of things does not mean "one of each of" the plurality of things.

Numerical terms such as "one", "two", etc. when used as cardinal numbers to indicate quantity of something (e.g., one widget, two widgets), mean the quantity indicated by that numerical term, but do not mean at least the quantity indicated by that numerical term. For example, the phrase "one widget" does not mean "at least one widget", and therefore the phrase "one widget" does not cover, e.g., two widgets.

The phrase "based on" does not mean "based only on", unless expressly specified otherwise. In other words, the phrase "based on" describes both "based only on" and "based at least on". The phrase "based at least on" is equivalent to the phrase "based at least in part on".

The term "represent" and like terms are not exclusive, unless expressly specified otherwise. For example, the term "represents" does not mean "represents only", unless expressly specified otherwise. In other words, the phrase "the data represents a credit card number" describes both "the data represents only a credit card number" and "the data represents a credit card number and the data also represents something else".

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

The term "e.g." and like terms mean "for example", and thus does not limit the term or phrase it explains. For example, in the sentence "the computer sends data (e.g., instructions, a data structure) over the Internet", the term "e.g." explains that "instructions" are an example of "data" that the computer may send over the Internet, and also explains that "a data structure" is an example of "data" that the computer may send over the Internet. However, both "instructions" and "a data structure" are merely examples of "data", and other things besides "instructions" and "a data structure" can be "data".

The term "respective" and like terms mean "taken individually". Thus if two or more things have "respective" characteristics, then each such thing has its own characteristic, and these characteristics can be different from each other but need not be. For example, the phrase "each of two machines has a respective function" means that the first such machine has a function and the second such machine has a function as well. The function of the first machine may or may not be the same as the function of the second machine.

The term "i.e." and like terms mean "that is", and thus limits the term or phrase it explains. For example, in the sentence "the computer sends data (i.e., instructions) over the Internet", the term "i.e." explains that "instructions" are the "data" that the computer sends over the Internet.

Any given numerical range shall include whole and fractions of numbers within the range. For example, the range "1 to 10" shall be interpreted to specifically include whole numbers between 1 and 10 (e.g., 1, 2, 3, 4, ... 9) and non-whole numbers (e.g., 1.1, 1.2, ... 1.9).

Where two or more terms or phrases are synonymous (e.g., because of an explicit statement that the terms or phrases are synonymous), instances of one such term/phrase does not mean instances of another such term/phrase must have a different meaning. For example, where a statement renders the meaning of "including" to be synonymous with "including but not limited to", the mere usage of the phrase "including but not limited to" does not mean that the term "including" means something other than "including but not limited to".

II. Determining

The term "determining" and grammatical variants thereof (e.g., to determine a price, determining a value, determine an object which meets a certain criterion) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The term "determining" does not imply certainty or absolute precision, and therefore "determining" can include estimating, extrapolating, predicting, guessing and the like.

The term "determining" does not imply that mathematical processing must be performed, and does not imply that numerical methods must be used, and does not imply that an algorithm or process is used.

The term "determining" does not imply that any particular device must be used. For example, a computer need not necessarily perform the determining.

III. Forms of Sentences

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device, article or other product is described herein, more than one device/article (whether or not they cooperate) may alternatively be used in place of the single device/article that is described. Accordingly, the functionality that is described as being possessed by a device may alternatively be possessed by more than one device/article (whether or not they cooperate).

Similarly, where more than one device, article or other product is described herein (whether or not they cooperate), a single device/article may alternatively be used in place of the more than one device or article that is described. For example, a plurality of computer-based devices may be substituted with a single computer-based device. Accordingly, the various functionality that is described as being possessed by more than one device or article may alternatively be possessed by a single device/article.

The functionality and/or the features of a single device that is described may be alternatively embodied by one or more other devices which are described but are not explicitly described as having such functionality/features. Thus, other embodiments need not include the described device itself, but rather can include the one or more other devices which would, in those other embodiments, have such functionality/features.

IV. Disclosed Examples and Terminology Are Not Limiting

Neither the Title (set forth at the beginning of the first page of the present application) nor the Abstract (set forth at the end of the present application) is to be taken as limiting in any way as the scope of the disclosed invention(s), is to be used in interpreting the meaning of any claim or is to be used in limiting the scope of any claim. An Abstract has been included in this application merely because an Abstract is required under 37 C.F.R. §1.72(b).

The title of the present application and headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

Though an embodiment may be disclosed as including several features, other embodiments of the invention may include fewer than all such features. Thus, for example, a claim may be directed to less than the entire set of features in a disclosed embodiment, and such claim would not include features beyond those features that the claim expressly recites.

No embodiment of method steps or product elements described in the present application constitutes the invention claimed herein, or is essential to the invention claimed herein, or is coextensive with the invention claimed herein, except where it is either expressly stated to be so in this specification or expressly recited in a claim.

The preambles of the claims that follow recite purposes, benefits and possible uses of the claimed invention only and do not limit the claimed invention.

The present disclosure is not a literal description of all embodiments of the invention(s). Also, the present disclosure is not a listing of features of the invention(s) which must be present in all embodiments.

All disclosed embodiment are not necessarily covered by the claims (even including all pending, amended, issued and canceled claims). In addition, an embodiment may be (but need not necessarily be) covered by several claims. Accordingly, where a claim (regardless of whether pending, amended, issued or canceled) is directed to a particular embodiment, such is not evidence that the scope of other claims do not also cover that embodiment.

Devices that are described as in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for long period of time (e.g. weeks at a time). In addition, devices that are in communication with each other may communicate directly or indirectly through one or more intermediaries.

A description of an embodiment with several components or features does not imply that all or even any of such components/features are required. On the contrary, a variety of optional components are described to illustrate the wide variety of possible embodiments of the present invention(s). Unless otherwise specified explicitly, no component/feature is essential or required.

Although process steps, algorithms or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention(s), and does not imply that the illustrated process is preferred.

Although a process may be described as including a plurality of steps, that does not imply that all or any of the steps are preferred, essential or required. Various other embodiments within the scope of the described invention(s) include other processes that omit some or all of the described steps. Unless otherwise specified explicitly, no step is essential or required.

Although a process may be described singly or without reference to other products or methods, in an embodiment the process may interact with other products or methods. For example, such interaction may include linking one business model to another business model. Such interaction may be provided to enhance the flexibility or desirability of the process.

Although a product may be described as including a plurality of components, aspects, qualities, characteristics and/or features, that does not indicate that any or all of the plurality are preferred, essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

An enumerated list of items (which may or may not be numbered) does not imply that any or all of the items are equivalent to each other or readily substituted for each other.

All embodiments are illustrative, and do not imply that the invention or any embodiments were made or performed, as the case may be.

V. Computing

It will be readily apparent to one of ordinary skill in the art that the various processes described herein may be implemented by, e.g., appropriately programmed general purpose computers, special purpose computers and computing devices. Typically a processor (e.g., one or more microprocessors, one or more microcontrollers, one or more digital signal processors) will receive instructions (e.g., from a memory or like device), and execute those instructions, thereby performing one or more processes defined by those instructions. Instructions may be embodied in, e.g., one or more computer programs, one or more scripts.

A "processor" means one or more of the following: microprocessors, central processing units (CPUs), computing devices, microcontrollers, digital signal processors, or like devices or any combination thereof, regardless of the architecture (e.g., chip-level multiprocessing/multi-core, RISC, CISC, Microprocessor without Interlocked Pipeline Stages, pipelining configuration, simultaneous multithreading).

Thus a description of a process is likewise a description of an apparatus for performing the process. The apparatus that performs the process can include, e.g., a processor and those input devices and output devices that are appropriate to perform the process.

Further, programs that implement such methods (as well as other types of data) may be stored and transmitted using a variety of media (e.g., computer readable media) in a number of manners. In some embodiments, hard-wired circuitry or custom hardware may be used in place of, or in combination with, some or all of the software instructions that can implement the processes of various embodiments. Thus, various combinations of hardware and software may be used instead of software only.

The term "computer-readable medium" refers to any medium, a plurality of the same, or a combination of different media, that participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols, such as Ethernet (or IEEE 802.3), SAP, ATP, Bluetooth™, and TCP/IP, TDMA, CDMA, and 3G; and/or (iv) encrypted to ensure privacy or prevent fraud in any of a variety of ways well known in the art.

Thus a description of a process is likewise a description of a computer-readable medium storing a program for performing the process. The computer-readable medium can store (in any appropriate format) those program elements which are appropriate to perform the method.

Just as the description of various steps in a process does not indicate that all the described steps are required, embodiments of an apparatus include a computer/computing device operable to perform some (but not necessarily all) of the described process.

Likewise, just as the description of various steps in a process does not indicate that all the described steps are required, embodiments of a computer-readable medium storing a program or data structure include a computer-readable medium storing a program that, when executed, can cause a processor to perform some (but not necessarily all) of the described process.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device which accesses data in such a database.

Various embodiments can be configured to work in a network environment including a computer that is in communication (e.g., via a communications network) with one or more devices. The computer may communicate with the devices directly or indirectly, via any wired or wireless medium (e.g. the Internet, LAN, WAN or Ethernet, Token Ring, a telephone line, a cable line, a radio channel, an optical communications line, commercial on-line service providers, bulletin board systems, a satellite communications link, a combination of any of the above). Each of the devices may themselves comprise computers or other computing devices, such as those based on the Intel® Pentium® or Centrino™ processor, that are adapted to communicate with the computer. Any number and type of devices may be in communication with the computer.

In an embodiment, a server computer or centralized authority may not be necessary or desirable. For example, the present invention may, in an embodiment, be practiced on one or more devices without a central authority. In such an embodiment, any functions described herein as performed by the server computer or data described as stored on the server computer may instead be performed by or stored on one or more such devices.

Where a process is described, in an embodiment the process may operate without any user intervention. In another embodiment, the process includes some human intervention (e.g., a step is performed by or with the assistance of a human).

VI. Continuing Applications

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application.

Applicants intend to file additional applications to pursue patents for subject matter that has been disclosed and enabled but not claimed in the present application.

VII. 35 U.S.C. §112, Paragraph 6

In a claim, a limitation of the claim which includes the phrase "means for" or the phrase "step for" means that 35 U.S.C. §112, paragraph 6, applies to that limitation.

In a claim, a limitation of the claim which does not include the phrase "means for" or the phrase "step for" means that 35 U.S.C. §112, paragraph 6 does not apply to that limitation, regardless of whether that limitation recites a function without recitation of structure, material or acts for performing that function. For example, in a claim, the mere use of the phrase "step of" or the phrase "steps of" in referring to one or more steps of the claim or of another claim does not mean that 35 U.S.C. §112, paragraph 6, applies to that step(s).

With respect to a means or a step for performing a specified function in accordance with 35 U.S.C. §112, paragraph 6, the corresponding structure, material or acts described in the specification, and equivalents thereof, may perform additional functions as well as the specified function.

Computers, processors, computing devices and like products are structures that can perform a wide variety of functions. Such products can be operable to perform a specified function by executing one or more programs, such as a program stored in a memory device of that product or in a memory device which that product accesses. Unless expressly specified otherwise, such a program need not be based on any particular algorithm, such as any particular algorithm that might be disclosed in the present application. It is well known to one of ordinary skill in the art that a specified function may be implemented via different algorithms, and any of a number of different algorithms would be a mere design choice for carrying out the specified function.

Therefore, with respect to a means or a step for performing a specified function in accordance with 35 U.S.C. §112, paragraph 6, structure corresponding to a specified function includes any product programmed to perform the specified function. Such structure includes programmed products which perform the function, regardless of whether such product is programmed with (i) a disclosed algorithm for performing the function, (ii) an algorithm that is similar to a disclosed algorithm, or (iii) a different algorithm for performing the function.

Where there is recited a means for performing a function that is a method, one structure for performing this method includes a computing device (e.g., a general purpose computer) that is programmed and/or configured with appropriate hardware to perform that function.

Also included is a computing device (e.g., a general purpose computer) that is programmed and/or configured with appropriate hardware to perform that function via other algorithms as would be understood by one of ordinary skill in the art.

VIII. Disclaimer

Numerous references to a particular embodiment do not indicate a disclaimer or disavowal of additional, different embodiments, and similarly references to the description of embodiments which all include a particular feature do not indicate a disclaimer or disavowal of embodiments which do not include that particular feature. A clear disclaimer or disavowal in the present application shall be prefaced by the phrase "does not include" or by the phrase "cannot perform".

IX. Incorporation by Reference

Any patent, patent application or other document referred to herein is incorporated by reference into this patent application as part of the present disclosure, but only for purposes of written description and enablement in accordance with 35 U.S.C. §112, paragraph 1, and should in no way be used to limit, define, or otherwise construe any term of the present application, unless without such incorporation by reference, no ordinary meaning would have been ascertainable by a person of ordinary skill in the art. Such person of ordinary skill in the art need not have been in any way limited by any embodiments provided in the reference Any incorporation by reference does not, in and of itself, imply any endorsement of, ratification of or acquiescence in any statements, opinions, arguments or characterizations contained in any incorporated patent, patent application or other document, unless explicitly specified otherwise in this patent application.

X. Prosecution History

In interpreting the present application (which includes the claims), one of ordinary skill in the art shall refer to the prosecution history of the present application, but not to the prosecution history of any other patent or patent application, regardless of whether there are other patent applications that are considered related to the present application, and regardless of whether there are other patent applications that share a claim of priority with the present application.

XI. Other Definitions

A "debt instrument" is a bond or other financial instrument having one or more payments due to a holder of the financial instrument. For instance, a bond issued to a bond purchaser for a face value of $100 on day one may have quarterly payments based on a 6% annual rate (e.g., $1.50 each quarter) due each quarter (or other time period) for five years and then a $100 payment due at the end of the fifth year. A "debt instrument portfolio" comprises a plurality of debt instruments. For purposes of convenience in this application, "one or more debt instruments" may be subsequently referred to as "the debt instrument(s)" or "the debt instruments". The company or other entity that issues a debt instrument shall be referred to herein as the "issuer" of that debt instrument.

A "cash flow rating" is generally an assessment of the likelihood that one or more payments of a debt instrument will be paid. A cash flow rating may assess the likelihood with respect to some or all of the coupons (or other payments) of a particular debt instrument or portfolio of debt instruments. A "good" or "high" cash flow rating corresponds to a high likelihood of payment of the coupons (or other payments or a high expected value of such payments.

A cash flow rating of a first financial instrument or portfolio of financial instruments is "superior to" (or "better" or "higher" than) a second cash flow rating of a second financial instrument or portfolio if the cash flow rating of the first financial instrument or portfolio indicates that the first financial instrument or portfolio has less risk, i.e., a lower likelihood of default and a higher likelihood of payments to the bond holder or a higher expected net present value, as compared to the second. For instance, an "AAA" rating from a conventional credit rating agency such as Moody's may indicate the credit rating agency's assessment of a lower risk of default than a "BBB" rating from the same credit rating agency.

A "payment" refers to a single scheduled payment on a debt instrument to a debt instrument holder. For example, a payment may comprise a coupon scheduled to be paid on the instrument.

A "net present value" is the difference between the present value of cash inflows and the present value of cash outflows. For a debt instrument comprising a series of coupon payments, a net present value is the sum of the present values of the various coupon payments (and any other payments). Net present value effectively compares the value of an enterprise or asset (e.g., a bond or a dollar or other currency) today to the value of the enterprise or asset (e.g., a bond or a dollar or other currency) in the future, taking inflation, the time value of money, and returns into account. Generally, a "present value" is the current worth of a future sum of money or plurality of payments, given a specified discount rate applicable to the payment(s), such as a discount rate associated with one or more U.S. Treasuries. Future cash flows are discounted at a discount rate, and the higher the discount rate, the lower the present value of the future payments.

A "hedge portfolio" is at least one of the following: (1) a portfolio of assets (e.g., one or more payments, debt instruments, other securities, etc.) that are determined to have a hedge position against one or more other portfolios; and (2) a portfolio of payments, debt instruments, and/or other securities, etc. that include assets that have one or more hedge positions against one another.

A "credit rating" may refer to an assessment of the creditworthiness of an issuer of one or more securities such as bond instruments. A credit rating may be determined by an entity that reviews financial information of the issuer, such as a third party credit rating agency such as Moody's, Standard & Poor's, and/or Fitch. An "initial credit rating" of a debt instrument is a credit rating of the debt instrument determined before or at the time of issuance of a security such as a debt instrument. For example, credit rating agencies may determine a credit rating of an issuance of bonds prior to the issuance of the bonds. For example, Moody's initial credit rating of an upcoming issuance of IBM bonds may be "AAA", a high credit rating indicating a high likelihood that all payments will be paid by IBM on the bond. Credit rating agencies and other entities may update and/or revise initial credit ratings over time, e.g., after issuance of the debt instrument.

As used herein, a "credit rating" by an agency is assumed to be the most recent credit rating of the issuer by that agency. Thus, if a credit rating agency issues a rating and then subsequently downgrades (or upgrades) the earlier rating, the downgraded (or upgraded) rating would be considered the current "credit rating" by that agency.

An "issuance" of a debt instrument, e.g., by an entity such as a business or government entity, refers to the time when the entity transfers a particular type of debt instrument to one or more other entities, who become the owners of that debt instrument.

For example, in an embodiment, the net present value of a coupon, cash payment (or other payment), or other amount at a future date is the amount that, if invested at a present time at the applicable interest rate (such as the current yield rate for treasuries over the same time period) would yield the coupon, payment, cash flow, or other amount at the future date. Accordingly, the net present value, if invested at the present time until the future date at the applicable interest rate, will yield the future value of the coupon, cash, payment, or other amount. If the applicable interest rate is 3%, then the net present value of a $103 payment in one year is $100, because $100 invested now at 3% will yield $103 in one year.

An "expected" value means a mathematical "expected value," such as an arithmetic mean or a weighted or unweighted average Accordingly, an "expected value" of a particular variable is the probability-weighted sum (or integral) of the possible values of that variable. Accordingly, an expected value can mean the sum of the values of a random variable with each value multiplied by the value's probability of occurrence. "Expected value" can also mean the integral of the product of a probability density function of a continuous random variable and the random variable itself when integrated over all values of interest of the variable (e.g., all possible values). In this application, "expected value" can also mean an estimation or "best guess" of a mathematical expected value, e.g., derived through indirect means.

By way of example, if there is a 90% chance of receiving $100 in one year and a 10% chance of receiving $150 in one year, then one measure of the expected value of this proposition could be calculated to be $105 next year (i.e., 90% times $100 plus 10% times $150).

A "net present expected value" is the net present value of one or more expected values of future quantities, e.g., a future expected value discounted to a present value. For an expected value of $105 next year where the applicable interest rate is 5%, the net present expected value would be $100 (because $100 invested at 5% for one year yields $105 (in a simple model assuming the interest rate is not compounded periodically or continuously).

An "amount" as used in this application may be an actual quantity (such as $50), and the "amount" may also be a percentage (or basis points) of a reference amount. For instance, an amount equal to 90% of a $50 bond may be expressed as "$45" or as "90%" (of $50).

DETAILED DESCRIPTION OF EXEMPLARY EMBODIMENTS

Traditional credit ratings systems typically issue a single rating for a single issuance of bonds at the time the bond is issued. The rating is typically a measure of the creditworthiness of the company issuing the bonds (the "issuer"), which measures the likelihood that the issuer will pay all coupons (or other payments) on the bond in full. In some cases, the rating may be revised (e.g., downgraded) at a later date before the bond's maturity. For example, if the issuer's financial health declines significantly, then its rating may decline to reflect a decreased likelihood that the issuer will pay all of the bond coupons (or other payments) in full.

Various embodiments of the present invention may comprise a method for determining a cash flow rating. A computing device receives information about a debt instrument portfolio comprising one or more debt instruments, the information comprising a quantity and a price (e.g., a purchase price) associated with each of the one or more debt instruments. The computing device determines a market price of each of the one or more debt instruments. The computing device determines a payment schedule for each of the one or more debt instruments, each payment schedule comprising one or more payments, each payment schedule correlating a series of payment amounts with respective scheduled times of payment. The computing device determines a probability of payment for the one or more payments for each of the one or more debt instruments. In some embodiments, the computing device may also determine an expected net present value of the one or more payments. The computing device may also determine a portfolio cash flow rating of the debt instrument portfolio based on: (1) the quantity and the price associated with each of the one or more debt instruments; (2) the market price of each of the one or more debt instruments; (3) the probability of payment for the one or more payments; and, in some embodiments, (4) the net present expected value of the one or more payments and the payment schedule for each of the one or more debt instruments. The computing device outputs the portfolio cash flow rating to an output device.

In another exemplary embodiment, the act of determining a portfolio cash flow rating of the debt instrument portfolio comprises determining the portfolio cash flow rating of the debt instrument portfolio based on an initial credit rating for each of the one or more debt instruments. Each initial credit rating is determined before an issuance of the corresponding debt instrument.

In another exemplary embodiment, the one or more debt instruments comprises at least two debt instruments, e.g., at least two corporate bonds.

In another exemplary embodiment, a method of determining a cash flow rating is provided. A computing device receives a request to determine a cash flow rating of a debt instrument. The computing device determines a purchase price of the debt instrument. The computing device determines a current market price of the debt instrument and a payment schedule comprising one or more payments on the debt instrument. The computing device determines a likelihood (e.g., a probability) of payment of the one or more payments, e.g., based on one or more financial conditions associated with an issuer of the debt instrument. The computing device causes a display, e.g., in grid format, of (1) a plurality of amounts between zero and a total net present value of the one or more payments, in sequential order, and (2) a rating indicating a likelihood (e.g., a probability) that each of the plurality of amounts will be received in connection with the debt instrument, e.g., in sequential order.

In another exemplary embodiment, a method of determining a cash flow is provided. The computing device receives a request to determine a cash flow rating of a plurality of debt instrument payments scheduled over a time period. The request comprises a user selection of a time period corresponding to at least one payment of at least one debt instrument. The at least one payment of the at least one debt instrument comprises a plurality of payments scheduled to occur during the selected time period. The computing device determines a present value of each of the at least one payments. The computing device determines a probability of payment for each of the at least one payments. In some embodiments, the computing device also determines a net present value of the at least one payments. The computing device determines a credit rating of the selected at least one payments based on the likelihood of default and the present value (e.g., a net present value) of each of the one or more payments. The credit rating is transmitted from the computing device to the user.

In another exemplary embodiment, the debt instrument payments are associated with a debt instrument, and the act of determining a credit rating comprises determining a credit rating of the selected at least one payments based on the likelihood of default, the present value (e.g., net present value) of each of the one or more payments, and an initial credit rating of the debt instrument determined before an issuance of the debt instrument.

In another exemplary embodiment, the request to determine a cash flow rating of a plurality of debt instrument payments scheduled over a time period comprises a user selection of a beginning of the time period and an end of the time period.

In another exemplary embodiment, a user interface is provided that enables a user to select one or more payments associated with one or more debt instruments. The selected payments may comprise a portion of the pending payments scheduled for the one or more debt instruments. The system may determine a cash flow rating for the selected payments. The user may input preferences and parameters associated with a target cash flow rating. For example, the user may target a cash flow rating of AA or greater.

In another exemplary embodiment, the user may request a cash flow rating for one or more debt instruments over one or more time periods. The user may select one or more debt instruments, e.g., debt instruments associated with a portfolio, e.g., of the user. For each debt instrument, the user may select one or more time periods. (Alternately, the user may select one or more time periods, and for each time period, the user may select one or more debt securities, e.g., debt instruments included in a portfolio of debt instruments.) A processor may determine one or more quantities and one or more prices associated with each debt instrument. In some embodiments, the user may also select one or more other parameters such as financial parameters, e.g., an interest rate and a discount rate. In some embodiments, a user interface in communication with a processor may prompt the user to select the debt instruments, time periods, quantities, prices, and parameters. The user interface may receive the user selections. The processor may receive the user selections and determine one or more cash flow ratings associated with one or more of the selected debt instruments based on one or more of the user selections. In some embodiments, one or more of the selections may instead be automatically determined, e.g., based on market information, information from outside sources, and information associated in a database with the user (e.g., a user profile or user account). For example, the one or more debt instruments and quantities may be determined based on debt instruments in a portfolio associated with a user; a price of a debt instrument may be determined based on a current, past, or future market price of the instrument; and parameters may be determined based on preferences stored in a user account.

In some embodiments, the processor may determine an improvement to the cash flow rating based on the one or more debt instruments, one or more time periods, prices, quantities, and other parameters selected by the user. The improvement may comprise a cash flow rating based on one or more of the same or different debt instruments, time periods, prices, quantities, and parameters specified by the user.

In another exemplary embodiment, a method of determining a cash flow rating is provided. A computing device receives information about a debt instrument portfolio comprising one or more debt instruments. The information comprises a quantity and a price (e.g., a purchase price) associated with each of the one or more debt instruments. The computing device determines a cash flow rating for the debt instrument portfolio based on the quantity and the price associated with each of the one or more debt instruments. Each of the one or more debt instruments has a schedule of payments comprising one or more payments. The computing device determines a probability of payment for the one or more payments of each of the one or more debt instruments. The computing device determines a cash flow rating for the debt instrument portfolio based on: (1) the quantity and the price associated with each of the one or more debt instruments; (2) a market price of each of the one or more debt instruments; and (3) the probability of payment for the one or more payments. In some embodiments, the cash flow rating may be determined based also on (4) a net present value of the one or more payments. The portfolio cash flow rating is transmitted from the computing device to the user. The computing device determines a hedge portfolio comprising one or more hedge securities, the information comprising a quantity and a market price associated with each of the one or more hedge securities. In some embodiments, the one or more hedge instruments have a probability of default that is inversely correlated to a probability of default of the one or more debt instruments. The computing device determines a collective cash flow rating for a collective portfolio comprising the debt instrument portfolio and the hedge portfolio. The collective cash flow rating may be superior to, and/or indicate a higher likelihood of payment than, the cash flow rating for the debt instrument portfolio. The collective cash flow rating and information about the hedge portfolio is transmitted from the computing device to the user.

In another exemplary embodiment, the cash flow rating for the debt instrument portfolio is based on an initial credit rating for each of the one or more debt instruments. Each initial credit rating may be determined before an issuance of the corresponding debt instrument.

In other embodiments, one or more systems comprising hardware and software for accomplishing these methods is provided.

FIG. 1. Exemplary System for Determining a Cash Flow Rating

Some embodiments of the present invention provide systems and methods for determining a cash flow rating.

Server 2 may comprise one or more processors, computers, computer systems, computer networks, and or computer databases. Server 2 may comprise modules 18-64. Server 2 may also comprise one or more databases, such as databases 80. Server 2 may communicate with users 10. For instance, server 2 may communicate with a user 10 computer, such as a browser of a user computer, e.g., over the internet.

Modules 18-48 may comprise one or more processors, computers, computer systems, and/or computer networks.

Databases 80 may comprise one or more processors, computers, computer systems, computer networks, and/or computer databases configured to store information. Each of databases 80 may communicate with server 2 and modules 18-64. For instance, server 2 and modules 18-48 may store information in databases 80 and may also use information stored in databases 80.

FIG. 1A depicts a system 100 for determining a cash flow rating.

The system 100 may comprise one or more servers 2 coupled to one or more databases 80, one or more data providers 8a-8n, and one or more end users 10a-10n. The data providers 8a-8n, users 10, agents 12, and server 2 may each communicate with each other. Users 10 may also communicate with other users 10, e.g., regarding one or more debt instruments or cash flow ratings. For example, a user 10a may propose to engage in a transaction with another user 10b to buy, sell, or exchange one or more securities of user 10a. For example, the system may determine a cash flow rating of a user's 10a portfolio and identify one or more changes to the portfolio that would improve the cash flow rating. The changes may comprise one or more securities, quantities, prices, counterparties, and other parameters associated with a current or future transaction associated with the portfolio. For instance, the system may recommend that the user 10a buy one or more securities in respective quantities, e.g., from users 10b and 10c, and sell one or more other securities in respective quantities, e.g., to users 10d and 10e. The system may identify counterparties 10b-10e based on information associated with those users, e.g., based on one or more preferences associated with or orders submitted by those users 10b-e, or other information.

In some embodiments, the system 100 may communicate with users 10a-10e and operate as (or communicate with) an exchange so that users 10a-10e may submit orders and execute trades with other users of the exchange. For example, the system may incorporate and/or utilize the computer systems, user interfaces, and other features and functionality as disclosed in U.S. Pat. No. 6,560,580 and U.S. patent application Ser. No. 09/801,495 filed Mar. 8, 2001, Ser. No. 10/301,527 filed Nov. 21, 2002, Ser. No. 10/699,858 filed Oct. 31, 2003, Ser. No. 11/122,510 filed May 4, 2005, and Ser. No. 12/189,266 filed Aug. 11, 2008, the disclosures of which are incorporated herein by reference in their entireties.

Users 10a-10n may comprise one or more persons, companies, financial entities, representatives, or other entities. A user 10 may be associated with one or more debt instruments. For example, user 10 may own or control one or more debt instruments in an account associated with the user 10 in a database. As used in this application, a user 10 may also refer to a user's interface to other system 100 components (such as server 2).

For example, a user's 10 interface may comprise a user's PDA or computer, or a program running on a user's computer such as a computer web browser like Internet Explorer™, which may communicate with data providers 8 and/or server 2. A user's 10 computer may comprise one or more processors, memories, and input and output devices for communicating with other modules, databases, and other system elements. A user's 10 computer and interface may comprise functionality to select one or more debt instruments and portfolios, and parameters (as described below). User's 10 computer may also comprise trading functionality to view and submit bids, offers, lifts, and takes. In some embodiments, user's 10 computer may comprise all the functionality of trader terminals known in the art, such as those used to trade over the New York Stock Exchange, NASDAQ, and eSpeed platforms.

Data provider(s) 8 may comprise any person, processor, information service, or other entity that publishes or otherwise provides information concerning one or more securities (such as debt instruments), company information (e.g., companies that issue one or more debt instruments), market information, and any other information described herein that may be relevant to a financial entity, financial instrument, financial data, and/or the determination of a value, price, probability, discount rate, cash flow rating, or other data. Data providers 8 may comprise a financial services provider, a data feed associated with a financial services company (such as a stock ticker), financial analyst, data service, website, or other source of information that may be relevant to a debt instrument or cash flow rating. For example, the information that may be provided by data providers 8 in various embodiments may comprise information about one or more of the following: one or more past, present, or predicted future prices (e.g., of one or more securities), financial information associated with one or more companies or industries, hedge information, correlation information, and any other financial, government, or historical information. In some embodiments, the data may include information that may be relevant to a determination of a cash flow rating associated with one or more debt instruments.

Data provider 8 may provide such information, e.g., financial information. Information may be provided in real time, as information first becomes available to the general public, or at another time. Information may be requested from data providers by server 2 and/or users 10, or it may be transmitted from data providers to server 2 and/or users 10 automatically, e.g., via data feed. Data provider 8 may provide such information in any one or more of a variety of forms and means such as video (e.g., financial news television program), audio (radio broadcast regarding stock prices), text (e.g., the words of a radio broadcast in text form), or other data that conveys such information to one or more users or system. Data may be provided at a variety of different timings. In some embodiments, data may be provided in periodically, continuously, or continually, e.g., via a data feed (e.g., a stream of data that includes real time updates of financial information). In some embodiments, data provider 8 may provide to server 2 (and/or users 10) a data feed of market information such as current and historical prices, company information, and financial events.

The server 2 may comprise a computer, server, hub, central processor, or other entity in a network, or other processor. The server 2 may comprise input and output devices for communicating with other various system 100 elements. In some embodiments, the server 2 may be comprised in an end user's computer 10. For example, server 2 may operate as a toolbar in a user's web browser or another program running on the user's computer. In some embodiments, the server 2 may comprise a plurality of servers and/or computers.

The server 2 may comprise a plurality of modules, such as module 18. Each module may comprise one or more processors, memories, and input and output devices for communicating with other modules, databases, and other system elements. In some embodiments, functions described herein for a specific module may be performed by the specific module or by the server 2.

Modules

User interface module 18 may communicate with users. User interface module 18 may communicate with users so that users can set up an account, log in to an account; prompt a user to submit preferences concerning one or more payments and/or debt instruments; receive user preferences and selections concerning one or more payments and/or debt instruments; communicate with users to provide information regarding one or more payments and/or debt instruments; or receive any other inputs from user and output any other outputs to user, as described herein.

User interface module 18 may cause information to be output to a user, e.g., at a user output device such as a display device (e.g., a display device at a user terminal), a speaker. The information outputted to a user may be related to a user account, one or more payments and/or debt instruments, preferences, and other information described herein. User interface module 18 may communicate the information electronically, e.g., via networked communication such as the internet (e.g., in an email or webpage), telecommunication service, etc.

User preferences module 20 may receive, identify, or determine user preferences concerning one or more payments and/or debt instruments. For instance, the module may receive the preferences from a user interacting with a user interface. The module may also receive them from an automated user terminal. The module may also determine them based on a program that automatically determines user preferences concerning one or more payments, debt instruments, and/or portfolios. User preferences may include preferences that are related to, or that specify, any of the following with respect to one or more payments or debt instruments: price, credit rating (from the system or from a traditional credit rating agency); volume; timing of one or more payments; and any other preferences (e.g., as described herein). For example, a user may specify a preference for system to identify the debt instruments and/or payments of a portfolio that have the worst or best cash flow rating, e.g., by highlighting them in a list of debt instruments or payments. For example, the three instruments or payments having the worst cash flow rating may be targeted for liquidation.

User account module 22 may create and manage a user account. The user account may comprise one or more debt instruments for which server 2 may determine a cash flow rating. In some embodiments, the user account may be a financial account such as a trading account, investment account, or other financial account. Accordingly, in some embodiments, user account module 22 may operate similarly to an online brokerage account, such as those offered by e*Trade, Ameritrade, Schwab, etc. In some embodiments, user account module 22 may determine information about a user's holdings based on the user's 10 order book.

Financial information module 24 may determine financial information associated with one or more users, one or more securities, one or more portfolios, one or more business enterprises (such as a company, partnership, corporation, etc.), and other financial information. The financial information may comprise any current, historical, and predicted financial information that may be relevant to the one or more users, one or more securities, one or more portfolios, and one or more business enterprises. For example, financial information may comprise current, historical, and predicted information concerning interest rates, prices of one or more entities (e.g., securities such as debt instruments), and/or any other financial information. For instance, with respect to a financial entity such as a company or financial instrument such as a debt instrument, financial information may comprise past, present, or predicted information concerning any of the following: market capitalization, price, earnings, volatility, volume traded during a time period, number and type of issued securities outstanding, dividends paid, highest or lowest price in a period, percentage of institutional ownership, beta, coupon value, issuance price, purchase price, market price, prices of related derivatives (e.g., calls, puts, and futures of a debt instrument), interest rate spread against U.S. treasuries, par, maturity, payment record (extent to which an issuer has timely paid all prior schedule payments), industry data, comparable company data, exchange rate to another currency, one or more government interest rates or changes in interest rate (e.g., a cut in a Fed rate), earnings, information in a financial report by an analyst or company (such as a 10Q, 10K, 8K, or other report or analysis), company debt, company assets, total cash and reserve, predicted time or likelihood of default, volatility of stock or bond price, volatility of market (e.g., one or more market indices such as the DJIA), information based on such financial information (such as a price to earnings ratio), exchange that trades the instrument, rating of an instrument or company by an entity (such as Moody's, Fitch's, or Standard and Poor's), an index (such as a broad market index or global sovereign index), a Treasury yield curve, a renegotiation or attempt to renegotiate terms of payment for a debt instrument, an announcement that a credit rating agency is seeking to review a prior rating of an issuer, and any other financial information. Financial information may also comprise more general information relating to the market or the economy (in the past, present, or predicted future), such as consumer credit information, the consumer price index, a government (e.g., U.S. federal government) budget balance, housing starts, jobless claims, unemployment rate, and other financial information.

Schedule module 26 may determine a schedule of payment(s) for one or more debt instruments. Payment scheduling information may be determined based on information associated with each debt instrument, such as schedule information in a description of the debt instrument, e.g., at a website of the issuer or in a database of an exchange that trades the instrument. For example, one debt instrument may specify a schedule of quarterly payments of $500 for ten years beginning on Jan. 1, 2000.

Volume module 28 may determine a volume of one or more debt instruments, e.g., in a portfolio. For example, volume module 28 may determine a quantity of a particular type of debt instrument, e.g., owned by a user. Volume module 28 may track the quantity as units of the debt instrument are purchased or sold by user, e.g., in a user account.

Credit rating module 30 may determine a credit rating of one or more issuers. In some embodiments, the credit rating may be determined based on manual and/or computer-implemented systems and methods known in the art, such as those used by Moody's, Standard and Poor's, Fitch's, and other rating agencies. For example, in some embodiments, issuer financial data and data relating to the economy, the issuer's industry, and other relevant financial data may be processed to determine a credit rating. In some embodiments, credit rating module 30 may determine a current credit rating and one or more future predicted credit ratings for a single issuer, e.g., based on information determined by financial information module. For example, credit rating may determine a current AAA credit rating for an issuer based on an average rating of several credit rating agencies, but predict a downgraded AA rating for the issuer two years in the future based on market indicators that indicate a recession.

In some embodiments, credit rating module 30 may determine a numerical credit rating, e.g., based on one or more third party credit ratings. The numeric rating may be equal to or associated with a probability, as discussed below with respect to probability module. For example, in one embodiment, credit rating module may determine the following associations: AAA=99.8%; AA=99%; A=98%; BBB=97%, etc. These numerical values may be used as probabilities of payment, or used to determine a probability of payment for one or more payments/instruments.

In some embodiments, credit rating module 30 may determine a credit rating based on one or more existing credit ratings, e.g., by one or more other agencies such as Moody's, Standard and Poor's, and Fitch's. Credit rating module 30 may determine a credit rating based on an average rating of one or more agencies. Averages may be weighted based on factors such as the reputation of the credit rating agency and the time of the rating (e.g., a recently updated rating may be weighted more heavily than earlier ratings by other agencies). In some embodiments, when a rating has recently been downgraded by a reputable rating agency, only that most recent rating may be used to determine a probability of a payment by the issuer.

Probability module 32 may determine one or more probabilities associated with one or more payments and/or debt instruments, such as a probability that one or more payments will be paid. For example, probability module 32 may determine a likelihood that one or more payments (such as all future payments) of a debt instrument (or plurality of payments) will be paid by an issuing company to the owner(s) of the debt instrument(s). Probability information may indicate a probability of payment for a single scheduled payment on a debt instrument, plurality of payments (such as all future payments) for a single debt instrument, one payment for each of a plurality of debt instruments, a plurality of payments for each of a plurality of debt instruments, any combination thereof, and any other set of payments (e.g., payments scheduled for one or more time periods).

Probability module 32 may determine probabilities based on any financial information related to a bond instrument, payment, issuer, market, economy, or other financial information discussed herein, such as information related to an issuer's financial health, price information related to a debt instrument or payment (e.g., par value, current market price, last traded price, purchase price, present value), quantity (e.g., of each debt instrument), and other financial information. For example, some circumstances may indicate a lower probability of payment, such as a renegotiation of terms of payments on a debt instrument (or attempt to renegotiate terms), an announcement of bankruptcy, an announcement that a credit rating agency will review a prior rating of an issuer, or other negative financial information.

In some embodiments, probability module 32 may determine a probability of one or more payments based on at least a comparison of (1) information related to the current market value (e.g., market price) of the payment and (2) information related to the amount of the payment(s), such as the net present value of the remaining scheduled payment(s) (e.g., assuming they all will be paid). For example, probability module 32 may compare the net present value of all remaining payments of a bond to the current market price (or estimate thereof, e.g., last traded price) of the bond. If the current market price is greater than or substantially equal to the present value of the first payment, then probability module may determine that there is a high probability that the first payment will be paid. If not, then the probability module 32 may determine a probability for the first payment that is equal to the current market value divided by the present value of the first payment, and determine an extremely low (close to zero) probability for all payments after the first. For instance, if the present value of the first payment is $100 and the current market value of the debt instrument is $50, then the probability of the first payment may be determined to be 50% and the probability of subsequent payments may be determined to be 1%. If the current market price is greater than or substantially equal to the present value of the first two payments (or three, four, five, etc.), then the probability of payment for those two payments (or three, four, five, etc. payments) may be determined to be high (e.g., 90% or higher). If the current market price does not "cover" a subsequent payment (in addition to the prior payments), then that subsequent payment may be determined to have a low probability of payment (e.g., 50% or less) and a low cash flow rating, such as "50 out of 100" or "D" (e.g., when the market value "covers" only 50% of the subsequent payment).

Generally speaking, in some embodiments, probability module 32 may determine probabilities of payments based on how the current market value compares to the net present value of future payments in a manner that reflects that probabilities tend to continually decrease for subsequent payment (due to increasing uncertainty) and the total expected value of payments should substantially equal the market price.

Probability module 32 may also determine other probability information related to one or more payments, such as a probability that: a company will default on any payment(s), remain solvent, file for chapter 11 or chapter 7 bankruptcy (or other bankruptcy-related provision in a controlling jurisdiction), seek to renegotiate one or more payments, and/or take any other financially significant action. Determined probabilities may also include probabilities that: interest rates will change, the economy will change, or other economic metric will change (such as exports of a nation or other jurisdiction will increase (or decrease)).

In some embodiments, probability module 32 may determine a probability that a scheduled payment of a debt instrument will be paid (e.g., on a scheduled payment debt, or by a particular date after a scheduled payment date) based on (at least) on one or more third party credit ratings of the issuer (e.g., a most recent credit rating by any of a set of recognized rating agencies, or an average measure of ratings from two or more rating agencies). For instance, a probability of payment for a future scheduled payment by an issuer may be high (e.g., at least 99%) if the issuer has a highest credit rating from a well-known rating agency, such as a AAA (or equivalent) rating from Moody's or Standard and Poor's. Similarly, the probability of payment may be determined to be low (e.g., 50%) if the issuer has a low credit rating (e.g., "C" or equivalent from Moody's or Standard and Poor's).

In some embodiments, the probability of payment may be determined from a table that matches probabilities with credit ratings, wherein high probabilities are matched with high credit ratings. For instance, one embodiment of such a table may provide the following correlations: AAA=99.8%; AA=99%; A=98%; BBB=97%, etc. In some embodiments, a different table may be used for each agency, and a probability may be used when more than one credit rating agency has assessed the issuer.

In some embodiments, probability module 32 may determine probabilities based on the time of the scheduled payment. Because payments in the distant future are effectively "less predictable" than payments in the near future (when an issuer's financial picture has less time to change radically), probabilities for payments in the more distant future may be discounted to account for the greater uncertainty. Accordingly, in some embodiments, probabilities in the near future may be determined using the table described above, but payments scheduled further in the future may be discounted, e.g., by a constant or variable factor. For example, the credit rating table (discussed above) may be used for probabilities of payment within a specific time period (e.g., within one year of a most recent credit rating). Probabilities for subsequent payments after the time period may be discounted. For example, a percentage of the probability (e.g., 1%) may be subtracted from the first year probabilities for each subsequent year. In this scenario, probabilities for all payments within a year of the most recent credit rating may be determined to be 97% (based on a credit rating table discussed above), probabilities for second year payments may be 96% (i.e., 97% minus 1%), probabilities for third year payments may be 95%, etc. Other discounting calculations (as known in the art) may be used. For example, probabilities based on credit rating (e.g., from credit rating table) may be raised to a power based on time. For instance, a probability of payment may be determined based on the equation P (at year t)=P (at year $0$)^t (wherein t is the time in years). In this scenario, a probability of payment at the present (t=0) may be determined to be 96% (based on an average rating of the three most recognized credit rating agencies using the table above), and so a payment 30 months from present (t=2.5) would be P=0.96^2.5 (i.e., 0.96 raised to the 2.5 power). This formula would discount the probabilities of payment by lower rated issuers at a greater rate than it would discount the probabilities of highly rated issuers. In other embodiments, a probability may decay over time according to the equation Probability (at time t)=P (at time $0$)*$e^{-rt}$., in which "r" is a constant rate, e.g., 0.01, or another rate determined based on historical data of other issuers, e.g., similarly situated issuers having similar credit ratings. Other formulas and calculations may be used.

Interest rate module 34 may determine one or more interest rates associated with one or more debt instruments. An interest rate may be calculated or otherwise determined based on financial information (e.g., current, historical, and predicted financial information) such as published interest rates, prices of one or more securities such as U.S. Treasury bonds, and other information. An interest rate may be determined for one or more time periods relevant to a payment schedule, such as the lifetime of a particular debt instrument. For example, if a bond instrument is issued on Jan. 1, 2000 and matures ten years later on Jan. 1, 2010, interest rate module 34 may determine a value for the interest rate over the entire time period. The interest rate may have different values over the period. For example, interest rate module 34 may determine that interest rate to be 3% over one specific time period, such as Jan. 1 to Mar. 31, 2015, and 3.5% over another time period, such as Apr. 1, 2015 to Mar. 31, 2016.

Interest rate module 34 may also determine an inflation rate based on financial information. In some embodiments, interest rate module 34 may determine a "real interest rate" that discounts an interest rate based on an inflation rate. Interest rate module 34 may use conventional algorithms and data to determine an interest rate and inflation rate. Interest rate module 34 may use conventional algorithms and data to determine inflation rates and interest rates.

Discount rate module 36 may determine a discount rate applicable to a specific time or time period. For example, a discount rate for an applicable time period may be equal to an interest rate for the same period. Discount rate module 36 may use conventional algorithms and data to determine an interest rate and inflation rate. Discount rate module 36 may use conventional algorithms and data to determine a discount rate.

Price module 38 may determine and associate one or more values or prices with one or more payments and/or debt instruments. For instance, price module 38 may determine a price or value for a portfolio of payments and/or debt instruments. Prices may include a current price, a historical price (e.g., a price such as a market price at a prior time, such as a week earlier or an original date of issuance of a debt instrument that pays a plurality of payments), and an estimated future price. In some embodiments, price module 38 may determine a purchase price of one or more instruments. For one or more instruments (or amounts of an instrument) purchased at different times, the purchase price may comprise a present value of all amounts paid for the one or more debt instruments. In some embodiments, a net present value of a purchase price may comprise a sum of the present values of all payments paid for the security (e.g., purchase prices including or not including any fees) minus the sum of the present values of all payments received for the security (e.g., scheduled payments that were paid).

In some embodiments, price module 38 may determine a past, present, or expected future market price for one or more payments, e.g., coupon payments from an issuer to an owner of a debt instrument. Such determinations may be based on financial information described herein. In some embodiments, price module 38 may estimate or otherwise determine a market price for one or more payments based on a market price of the instrument and futures prices for the instrument, e.g., as described herein and/or as known in the art.

In some embodiments, price module 38 may derive a price (e.g., an estimated current market price) of one or more scheduled payments on a debt instrument using financial information, e.g., as known in the art. For instance, such a price may be derived from information such as a current market price of the debt instrument, a futures price of the debt instrument (e.g., a time just after the one or more scheduled payments), and an interest rate (e.g., and/or discount rate). In this way (and according to methods known in the art), price module may allocate one or more portions of a market price of a debt instrument to the various "payment components" of the debt instrument.

In some embodiments, price module 38 may allocate one or more portions of a purchase price of a debt instrument (or series of purchases over time for the same debt instrument) to a plurality of payments of the debt instrument (e.g., past, present, and future payments related to the purchase price). For example, portions of a purchase price may be allocated to payments in a similar manner or ratio as a market price may be allocated to the payments.

Present value module 40 may determine a present value and/or a net present value (e.g., an expected net present value) of one or more values such as prices, e.g., prices or values of one or more debt instruments or portfolios. Present values may be determined based on financial data described herein. For example, present values of one or more debt instruments and/or portfolios may be determined based on a current value of the one or more debt instruments and/or portfolios (and/or one or more cash flows associated with the one or more debt instruments and/or portfolios), one or more applicable discount rates, and/or other relevant financial information. Present value module 40 may use an interest rate and/or a discount rate to determine present values of past or future values, e.g., according to methods described herein and/or known in the art.

It should be noted that all prices and payments herein may be adjusted to a present value or other time value (e.g., based on a discount rate, or to account for the time value of money).

Cash flow rating module 42 may determine one or more cash flow ratings for one or more payments, one or more debt instruments, and/or one or more other assets (such as securities). For example, cash flow rating module 42 may determine a cash flow rating for one or more debt instruments and/or one or more payments (e.g., scheduled payments for one or more debt instruments). A cash flow rating may be determined based on information that may be relevant to a cash flow rating such as financial data, including any data received or determined by system's modules. For example, a cash flow rating may be determined based on one or more parameters associated with each payment and/or debt instrument (and/or one or more parameters associated with a plurality of payments and/or debt instruments), such as an issuance price of a debt instrument, par value of the instrument, a purchase price of a debt instrument (such as a purchase price of a current owner), a current market price of the debt instrument, a present value (e.g., of future scheduled payments on the instrument), a probability of payment for one or more payments (e.g., for a debt instrument), an expected value of a payment or debt instrument, a time period of interest, an interest rate associated with a time period of interest, an inflation rate associated with a time period of interest, a discount rate associated with a time period of interest, a U.S. Treasury bond interest rate and/or market price, information related to the health of an issuer of a debt instrument (such as a balance sheet, 10Q, 10K, 8K, or other financial report by the company), information about a company produced by analysts, and any other data that may be relevant to a price or value of a company issuer or financial instrument of a company issuer, and any other financial information.

Cash flow rating module 42 may determine a cash flow rating for a portfolio of debt instruments and/or payments based on individual cash flow ratings determined for each debt instrument and/or payment. For example, a cash flow rating for a portfolio may be determined as a weighted average of the components (e.g., weighted according to present value).

In some embodiments, a cash flow rating of an instrument (or portfolio) based (at least in part) on an owner's purchase price of the instrument(s) may reflect a likelihood that the owner's investment in the debt instrument(s) will be returned, e.g., via payments on the debt instrument(s) (e.g., discounting future payments to account for the time value of money). In some embodiments, a cash flow rating of an instrument (or portfolio) based (at least in part) on par (or a price at issuance) of the instrument(s) may reflect a likelihood that the debt instrument(s) will return par (or the price at issuance), e.g., via payments on the debt instrument(s) (e.g., discounting future payments to account for the time value of money).

Cash flow rating module 42 may determine a cash flow rating based on financial data using one or more formulas. In some embodiments, cash flow rating module may determine a cash flow rating by comparing an expected value of a net present value of one or more debt instruments compares to a current market price and/or a purchase price of the one or more debt instruments. For example, cash flow rating module 42 may determine a very good cash flow rating (e.g., an "AAA" rating) for a portfolio of debt instruments that have an expected net present value of $1000 when the net present purchase price of those debt instruments is $1000 or less. In some embodiments, the rating may be numerical (e.g., "84.3" out of 100); in other embodiments, the rating may be alpha-numeric (e.g., "BB" or "B1" out of a possible "AAA").

In some embodiments, a cash flow rating may be correlated to or associated with a specific probability (or probability range) that a particular investment will yield a positive return on investment (e.g., accounting for the time value of money and/or other factors such as transaction costs). For example, an "AAA" rating may correlate to a 99-100% chance of a full return (or greater than full return) on investment. Similarly, an "AA" rating may indicate a 97-98% chance, an "A" rating may indicate a 95-96% chance, a "BBB" rating may indicate a 92-94% chance, etc.

In some embodiments, a cash flow rating may also indicate an extent to which a return is expected to exceed an initial investment. For example, a AAA+ rating may indicate that there is a 99-100% chance that a bond investment will return at least 110% of the initial investment. Similarly, an AAA++ may indicate a 99-100% chance that the investment will return at least 120%.

In some embodiments, a cash flow rating may have multiple components (e.g., letters, numbers, plus or minus signs, other alpha-numeric symbols, and/or other color coding, highlighting, and/or other formatting) to indicate different types of information. Such different types of information may comprise a probability of yielding a full return on investment, a probability of yielding an additional 10% (or other number) on investment, a probability of returning only 90% of the investment, a measure of error in the probability assessment (e.g., a confidence metric or p value). For example, in some embodiments, a BBB+++ in bold may indicate a 92-94% chance that the investment will yield a full return ("BBB"), a 30% chance (10% for each "+") that the debt instrument will return double the net purchase price, and the bold may indicate that a hedge security would increase the credit rating by at least one letter value (e.g., from "BBB" to "A").

Figure 9:
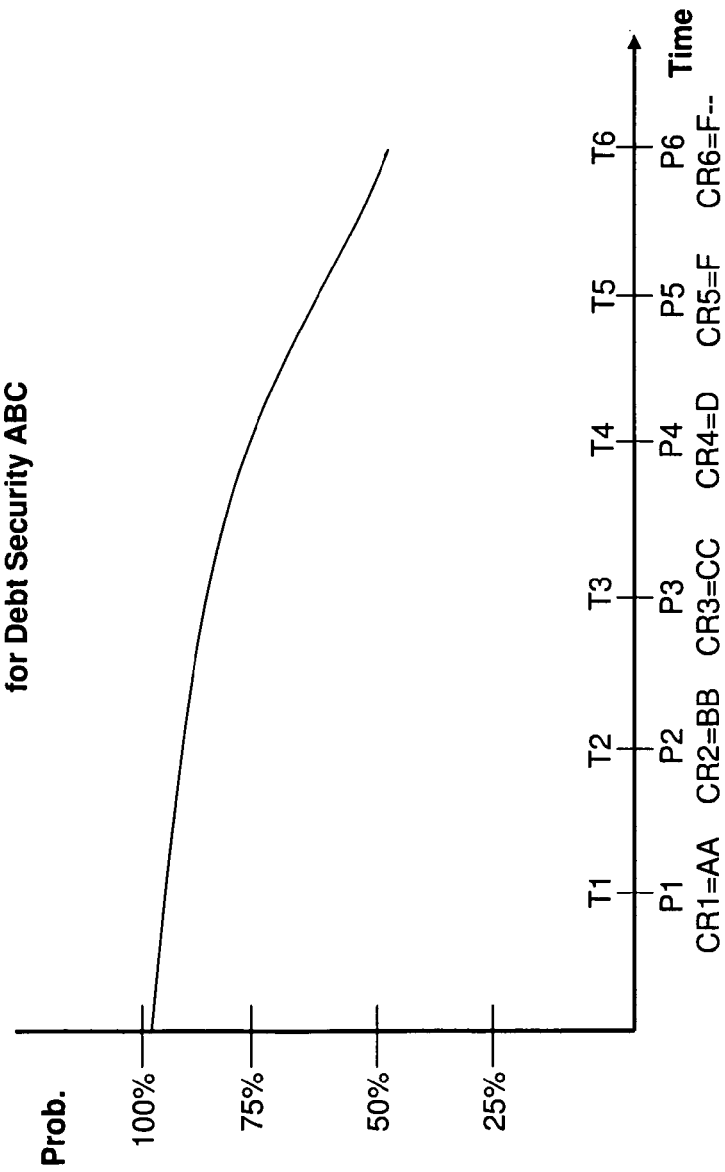
FIG. 9 shows an exemplary diagram showing probability of payment versus time according to an exemplary embodiment of the invention.

In some embodiments, a cash flow rating may indicate a probability for each payment of a particular debt instrument. (For example, a cash flow rating may comprise any information determined by probability module.) For example, a cash flow rating may comprise a graph showing an expected probability of payment (e.g., in the y axis) versus time of payment (e.g., in the x axis). In some embodiments, for a typical company the graph would show an exponential-type decay of probability from a value slightly less than 1 (e.g., 0.99 or 99% probability) at time zero to a lower value at the last scheduled payment date. The rate of decay may depend on financial information such as the market price of the debt instrument, futures prices of the debt instrument, company health information, industry information, etc., e.g., as discussed in probability module. For example, an exemplary probability of payment versus time graph is shown in FIG. 9, described below.

In some embodiments, a cash flow rating for a specific payment or debt instrument may be determined based on a comparison of an issuer's business fundamentals and a purchase price of the instrument, without regard to the current market price. For example, cash flow rating module 42 may determine a high rating (e.g., AAA or 99) based on strong business fundamentals that indicate that a debt instrument will return (e.g., in payments) significantly more than a net present value of the purchase price of the debt instrument. Conversely, in some embodiments, cash flow rating module 42 may determine a low rating (e.g., C or 60) based on a weak balance sheet that indicate that a debt instrument will return (e.g., in payments) significantly less than a net present value of the purchase price of the debt instrument. In some embodiments, a cash flow rating that is not based on a market price may be desirable for debt instruments that are illiquid, or that trade relatively infrequently.

In some embodiments, cash flow ratings may be determined based on a comparison of a purchase price (e.g., a net present value of the purchase price less payments received on the debt instrument) and the current market price of the debt instrument. A high rating (e.g., AAA or 99 out of 100) may be determined for a debt instrument whose market price exceeds the net present value of the purchase price, a lower rating (e.g., C or 80 out of 100) may be determined for a debt instrument whose market price is lower than the purchase price, and a very low rating (e.g., D or 50 or less out of 100) may be determined for a debt instrument whose market price is less than half the net present value of the purchase price.

It should be understood that a cash flow rating for a portfolio comprising a plurality of debt instruments may be determined based on a cash flow rating for each debt instrument determined separately. For example, a portfolio cash flow rating may comprise a weighted average of the plurality of cash flow ratings (e.g., weighted based on current market value, net purchase price, expected future value, or another metric).

Hedge module 44 may determine hedge information, e.g., associated with one or more payments and/or debt instruments. For example, hedge module 44 may identify one or more debt instruments and/or payments that are more (or less) likely to be repaid in various circumstances. Hedge module 44 may also determine correlations between one or more debt instruments and/or payments. For instance, hedge module 44 may determine industry sectors for each of a plurality of debt instruments. Hedge module 44 may also determine market condition data for each of a plurality of debt instruments, such as current and historical data about an industry sector as well as information about the future of the sector (e.g., whether the industry is expected to grow by more than 3% each year for the next five years). For example, hedge module 44 may determine that the probability of repayment for a bond issued by a yacht company is inversely correlated to a probability of repayment for a bond issued by a canned soup company.

Hedge module 44 may identify or otherwise determine one or more hedge securities for a given set of payments and/or debt instruments. The hedge securities may comprise one or more financial instruments (e.g., securities, derivatives, and other financial instruments) that have been determined (e.g., by system) to have or possibly have a hedge effect in relation to one or more other financial instruments. A hedge security may be a security that is determined to minimize or protect against a loss by counterbalancing one transaction, such as a bet or stock purchase, against another. A hedge security of a first security may be an interest (such as a stock or bond) in a business sector that is negatively correlated to a business sector of the first security. For example, a hedge security of a first security may comprise a security that will tend to rise in value if the first security falls in value. For instance, a long position on one stock will hedge against a short position on the same stock. Similarly, futures derivatives in a commodity can hedge against an ownership interest in a company sells the commodity by protecting against a decrease in the price of the commodity.

In some embodiments, hedge module 44 may determine a hedge security of a first security to be an interest in a company that is a competitor of the first company. In some cases, a failure of a first company will increase the likelihood of success of its competitors (e.g., due to decreased competition), and thereby improve the performance of a stock or bond in the competitor companies. For example, the likelihood of payment of Pepsi bonds may increase if Coke goes bankrupt. In other cases, a failure of one company (e.g., Coke) may indicate negative financial circumstances for its competitors (e.g., Pepsi) as well. Accordingly, hedge module may identify securities (e.g., bonds) in other industry segments that are likely to do well when companies in another industry segment are having financial trouble.

Hedge module 44 may determine "hedge securities" (i.e., securities that may tend to hedge against positions in one or more other securities, such as securities in a user's portfolio) and/or characteristics of one or more hedge securities. Hedge characteristics may comprise features desirable for a security to be added to user's portfolio, e.g., as described herein.

In some embodiments, hedge module 44 may determine one or more assets (e.g., securities such as debt instruments) (e.g., and quantities of those assets) that would improve a portfolio's cash flow rating, by adding to user's portfolio or being eliminated from user's portfolio (such as debt instruments that have a lower cash flow rating or contribute to a lower portfolio cash flow rating). Similarly, hedge module 44 may determine that one or more debt instruments and/or payments in a portfolio adversely affect the portfolio's cash flow rating. For instance, hedge module 44 may determine that a cash flow rating for a portfolio of 100 IBM bonds and 20 Google bonds is 79, while a portfolio of 50 IBM bonds and 75 GE bonds is 85 (e.g., wherein the portfolios have the same market value). In some embodiments, user 10 and/or server 2 may buy or sell one or more securities to improve one or more characteristics (e.g., a hedge characteristic and/or improved cash flow rating) of a portfolio such as the user's 10 portfolio. For instance, hedge securities may be purchased, and/or one or more securities in the existing portfolio may be sold, e.g., via exchange module 50 (as described below).

Parameters module 46 may determine parameters or other criteria for one or more payments and/or debt instruments. For instance, parameters module 46 may determine search parameters for finding securities (e.g., debt instruments) and/or one or more sets of payments that satisfy user preferences and/or hedge criteria. Parameters module 46 may determine parameters based on input from a user 10 or other information. For example, parameters module 46 may receive parameters or selections of parameter values from a user, e.g., based on prompts from the server 2. Parameters may comprise financial information (as described above) including, e.g., information about targeted payment dates, industry sectors, payment amounts, preferred issuers, preferred balance between asset classes, other desirable features of a portfolio described herein, and other financial criteria. For example, parameters module 46 may receive from a user a request to find and purchase a specified present value of debt instruments that have a particular payment schedule and market price, such as debt instruments that have a high cash flow rating and a desirable hedge characteristic.

Instrument search module 48 may search for and identify one or more payments and/or debt instruments based on one or more parameters, e.g., parameters selected by a user 10. For instance, instrument search module 48 may search one or more financial databases (e.g., a database that stores information relating to a plurality of payments and debt instruments), e.g., via the internet, to determine one or more payments and/or debt instruments that satisfy one or more parameters, such as parameters based on preferences from a user.

In some embodiments, instrument search module 48 may identify one or more securities that would improve a hedge characteristic and/or cash flow rating of a portfolio, such as a user's 10 portfolio. (In other words, instrument search module 48 may identify securities that, when bundled together with instruments in a portfolio, would improve hedge characteristics and/or a net cash flow rating of the modified portfolio).

Exchange module 50 may operate a trading exchange or trading system in which users 10 may buy and sell financial instruments such as debt instruments. The trading exchange may have functionality similar to the New York Stock Exchange, the Chicago Mercantile Exchange, NASDAQ, and other exchanges known in the art. The trading exchange may comprise the eSpeed platform.

In some embodiments, exchange module 50 may buy and sell assets in a portfolio, e.g., to improve a portfolio's cash flow rating. For example, hedge securities may be purchased, and existing debt instruments may be sold, e.g., to improve the cash flow rating. The computer may do this automatically. For instance, a user may specify that the system should reallocate the portfolio to maximize the cash flow rating. The user may specify various parameters, e.g., that the portfolio must maintain ownership of a certain set (or minimum amount) of specific debt instruments (such as to maintain a minimum of 200 IBM bonds and 300 Coke bonds). In some embodiments, the user may specify an amount of "discretionary" assets or cash that may be used to buy and sell hedge securities, e.g., to improve or maximize the portfolio's cash flow rating. In some embodiments, exchange module 50 may automatically buy and sell instruments in a portfolio, e.g., to maximize one or more criteria such as a return, a cash flow rating, diversification, a particular balance between security classes, and any other feature of a portfolio that may be desired by a user. Such automatic "rebalancing" may occur continuously or periodically, e.g., every day, week, month, or year, or at times or periods specified by a user. For example, at the end of each day or week exchange module 50 may apply cash in portfolio and/or sell a portion of discretionary debt instruments to purchase one or more hedge securities to improve a portfolio's cash flow rating.

The various modules may function separately or in various combinations. While the modules are shown within a single server, the modules may also operate among several servers. The modules may communicate with a plurality of databases, which may also function collectively or separately.

The modules of server 2 may store, access and otherwise interact with various sources of data, including external data, databases, inputs, and other sources of data.

Databases

One or more databases 80 may be coupled to the server 2. The database 80 may comprise a plurality of databases as described below. Databases 80 may store any information described herein about users, modules, financial information, cash flow ratings, and other information. For example, database 80 may store information associated with a user and a user account, such as a user name, account security information such as a password or code, and user preferences, e.g., regarding one or more parameters. For any user having a financial account, the database may store information about the user account, such as one or more debt instruments and other securities associated with the user. Such instruments may include instruments owned by, controlled by, and/or selected by the user, and/or instruments that satisfy one or more criteria associated with the user (e.g., parameters selected by the user or associated with the user based on user information such as a preference determined by a processor).

Database 80 may store hedge information associated with one or more debt instruments, payments, and/or groups of debt instruments and/or payments.

While the databases are shown coupled to a single server, the databases may also operate among several servers. The databases may communicate with a plurality of modules and servers, which may also function collectively or separately to perform the features and functions described here.

An Exemplary Method

Figure 3:
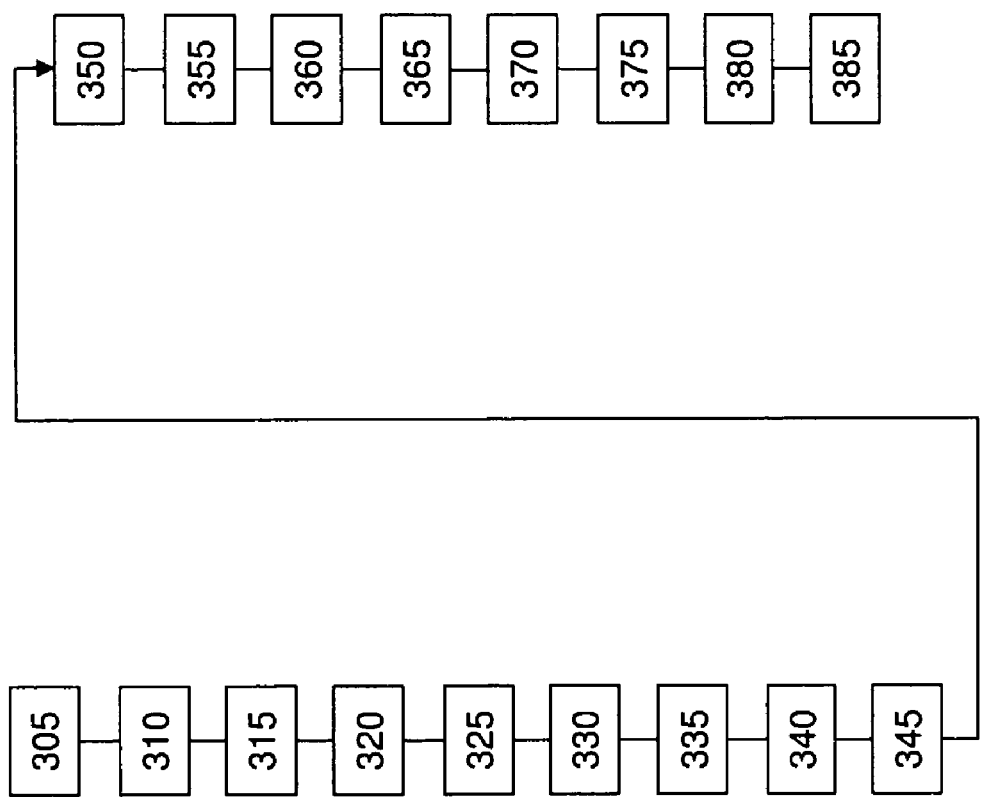
FIG. 3 depicts a flow diagram according to at least one embodiment of the methods disclosed herein.

FIG. 3 depicts a flow diagram according to at least one embodiment of the methods disclosed herein. It should be understood that each function(s) described for each block may be performed using a module capable of performing that function, e.g., according to methods described for each module above.

In block 305, the system 100 may receive login information, e.g., from a user. For example, the user may access the system to log in to an account of the user managed by the system. The login information may be any information for use in authenticating a user and providing thereto one or more of the functions disclosed herein. The login information may be, for example, a user ID, password, biometric data, etc. The login information may be submitted by a user with a user interface screen that includes therein at least one form element, such as an input field or text box, a drop down list, check box, radio buttons, action buttons, clickable images, etc., for entering login data. Following submission, the login information may be compared with previously obtained information and access to one or more of the functions may be provided based on a positive match.

In block 310, one or more debt instruments may be identified. The debt instrument(s) may be selected or otherwise identified by a user and/or determined by a processor based on information associated with the user. For example, the debt instruments may be identified to be a portfolio of debt instruments in a user's account, e.g., debt instruments that are owned by the user. The account may be managed by server 2.

In block 315, information about the one or more identified debt instruments may be determined. The information for each debt instrument may comprise one or more of a volume (quantity), price (original price, current market price, bid or offer price, or other price associated with a debt instrument), coupon payment schedule (e.g., including amounts), principal amount, interest rate, maturity, and/or any other parameter that can be associated with an existing or target debt instrument. For instance, a user may provide information about the debt instruments.

Figure 7:
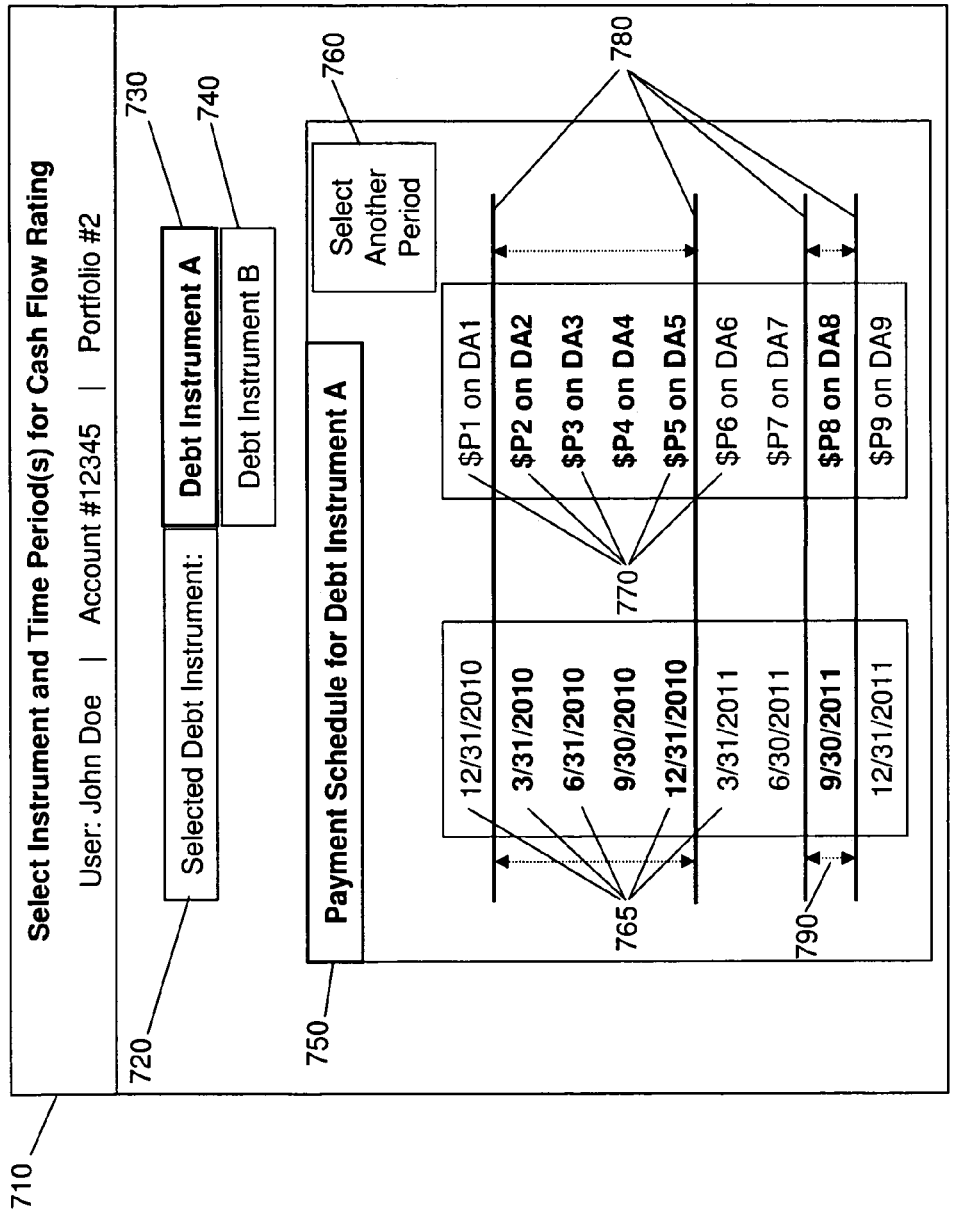
FIG. 7 depicts an exemplary interface showing information associated with a selection of a time period for determining a cash flow rating according to at least one embodiment of the invention disclosed herein.

In block 320, one or more payments associated with the one or more debt instruments may be identified. For example, the one or more payments may be selected by a user. All or a portion of the payments in the instrument's payment schedule may be identified. The portion of payments may comprise a single payment, a series of payments in a row (e.g., payments 3-8, or all of the payments in a specific quarter or year) and/or one or more payments not in a row (e.g., payments 2, 7, 10-12, and the payment at maturity). For example, a user may select various "time slices" of a payment at an interface, e.g., as shown in FIG. 7. The action in this block may be optional or ignored in embodiments where all of the payments (or the remaining payments, if some payments have already been paid) will be used for determining a cash flow rating.

In block 325, information such as financial information about the one or more payments may be determined, e.g., by a processor. For example, a payment schedule for the one or more payments may be determined, e.g., by a processor, e.g., based on information obtained from one or more data providers. The payment schedule may comprise at least amounts and dates for each payment.

In block 330, a value may be associated, e.g., in a database, with one or more of the payments (e.g., one, some or all of the payments). For instance, a present value for each payment (or for a plurality of the payments collectively) may be determined.

In block 335, a probability of payment may be determined for one or more of the payments, e.g., by a processor. The probabilities may be calculated for one, some, or all of the payments, e.g., as described above using probability module.

In block 340, hedge information may be received, e.g., by the processor, for one or more of the payments and/or debt instruments. Hedge information may be determined by hedge module as described above.

In block 345, hedge information may be determined, e.g., by the processor, for one or more of the payments and/or debt instruments. For example, positive and negative correlations may be determined future payments of two different bond issuers in different industry sectors. Hedge information may be determined as described above, e.g., for hedge module.

In block 350, a net present value may be determined, e.g., by the processor, for one or more of the payments and/or debt instruments. A net present value may be determined as described herein.

In block 355, a cash flow rating may be determined, e.g., by the processor, for one or more of the payments and/or debt instruments. For instance, a cash flow rating may be determined for a set of payments and/or debt instruments selected by a user and/or the processor. The cash flow rating may be determined based on one or more criteria and/or parameters associated with the one or more payments and/or debt instruments, such as volume, probability of payment, purchase price, current market price of a payment (e.g., a current market value of a right to receive one or more future scheduled payments), historical market price, projected future market price, financial information associated with the issuer of the debt instrument (e.g., financial information that may be listed in a 10-Q, 10-K, or analyst report for the issuer). A cash flow rating may be determined as described herein.

In block 360, payment and/or instrument parameters may be determined, e.g., as described herein. For example, a user may specify parameters for debt instruments that may be purchased to improve the portfolio's cash flow rating.

In block 365, one or more hedge securities may be determined, e.g., by the processor, e.g., based on payment and/or instrument parameters as described herein. For example, the processor may determine one or more hedge securities would or could have a hedging effect on one or more debt instruments associated with the user.

In block 370, one or more securities in user's portfolio may be identified, e.g., as described herein. The securities may be identified as having or contributing to a lower cash flow rating. These securities may be targeted for liquidation in order to improve the portfolio's cash flow rating.

In block 375, one or more securities in user's portfolio may be sold, e.g., as described herein.

In block 380, one or more hedge securities may be purchased, e.g., as described herein. For example, the processor may purchase a portfolio (e.g., a hedge portfolio) based on a user's preferences and/or parameters. The hedge securities may be purchased using cash in user's account and/or proceeds from a sale of a portion of user's portfolio.

In block 385, a determined cash flow rating information may be transmitted, e.g., by a processor to a user. For example, the processor may transmit a cash flow rating to a user's terminal that outputs the cash flow rating at a display device at the user's terminal.

It should be understood that in some embodiments, some or all of the actions of the methods described herein may be performed, in any order.

Figure 4:
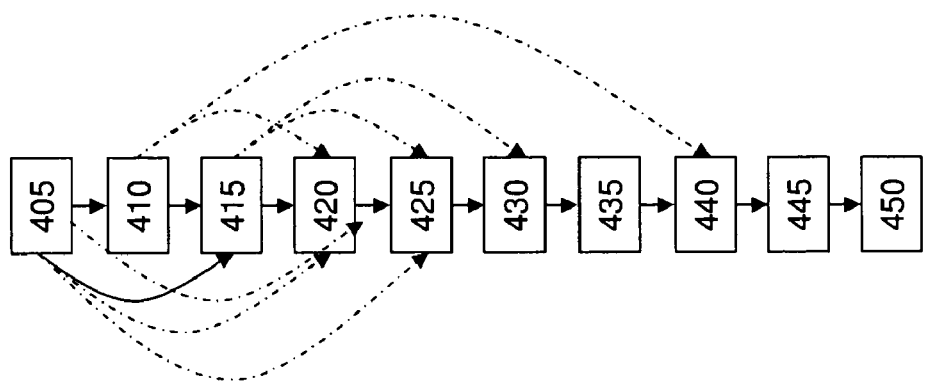
FIG. 4 depicts a flow diagram according to at least one embodiment of the methods disclosed herein.

FIG. 4 depicts a flow chart illustrating another exemplary method of determining a cash flow rating.

In block 405, a user may provide preferences concerning a cash flow rating, e.g., by inputting preferences at an input device coupled to a server. The preferences may include a target cash flow rating (e.g., a target minimum cash flow rating), and/or any other preference described here. For instance, the preferences may specify a target cash flow rating for various subsets of debt instruments and/or payments. For example, for a given portfolio of debt instruments and/or payments, a user may specify a preference for a higher minimum cash flow rating in years 1-5 and a lower minimum cash flow rating for years 6-7 and then a medium minimum cash flow rating for years 8 and 9.

In block 410, one or more debt instruments and/or payments may be identified. For example, a user may select or otherwise identify a portion of debt instruments in a user's portfolio, and/or a portion of payments on a particular debt instrument.

In block 415, one or more debt instruments and/or payments may be identified based on the user preferences.

In block 420, a determined cash flow rating information may be transmitted, e.g., by a processor to a user. For example, the processor may transmit a cash flow rating to a user's terminal that outputs the cash flow rating at a display device at the user's terminal.

In some embodiments, the following additional actions may take place in conjunction with (before, after, or during) or independently of any actions described above.

In block 425, a user may request one or more cash flow ratings, e.g., associated with one or more debt instruments or portfolios of debt instruments. The request may be transmitted to a processor.

In block 430, a processor may process the request and determine parameters associated with the cash flow rating, e.g., based on user information, user portfolio information, and market information.

In block 435, the processor may prompt the user for information associated with the requested cash flow rating(s). The information may comprise one or more time periods, quantities, prices, and other parameters. The processor may transmit a menu of possible parameter values that may be selected.

In block 440, the user may select one or more debt instruments, e.g., debt instruments associated with a portfolio, e.g., of the user. For each debt instrument, the user may select one or more time periods. (Alternately, the user may select one or more time periods, and for each time period, the user may select one or more debt securities, e.g., debt instruments included in a portfolio of debt instruments.) A processor may determine one or more quantities and one or more prices associated with each debt instrument. In some embodiments, the user may also select one or more other parameters such as financial parameters, e.g., an interest rate and a discount rate. In some embodiments, a user interface in communication with a processor may prompt the user to select the debt instruments, time periods, quantities, prices, and parameters. The user interface may receive the user selections.

In block 445, the processor may receive the user selections and determine one or more cash flow ratings associated with one or more of the selected debt instruments based on one or more of the user selections. In some embodiments, one or more of the selections may instead be automatically determined, e.g., based on market information, information from outside sources, and information associated in a database with the user (e.g., a user profile or user account). For example, the one or more debt instruments and quantities may be determined based on debt instruments in a portfolio associated with a user; a price of a debt instrument may be determined based on a current, past, or future market price of the instrument; and parameters may be determined based on preferences stored in a user account.

In block 450, the processor may determine an improvement to the cash flow rating based on one or more debt instruments, one or more time periods, prices, quantities, and other parameters selected by the user or determined by processor. The improvement may comprise a cash flow rating based on one or more of the same or different debt instruments, time periods, prices, quantities, and parameters specified by the user. One or more debt instruments may be sold or purchased to improve the portfolio's cash flow rating. A new cash flow rating of the revised portfolio may be output to user.

Figure 5:
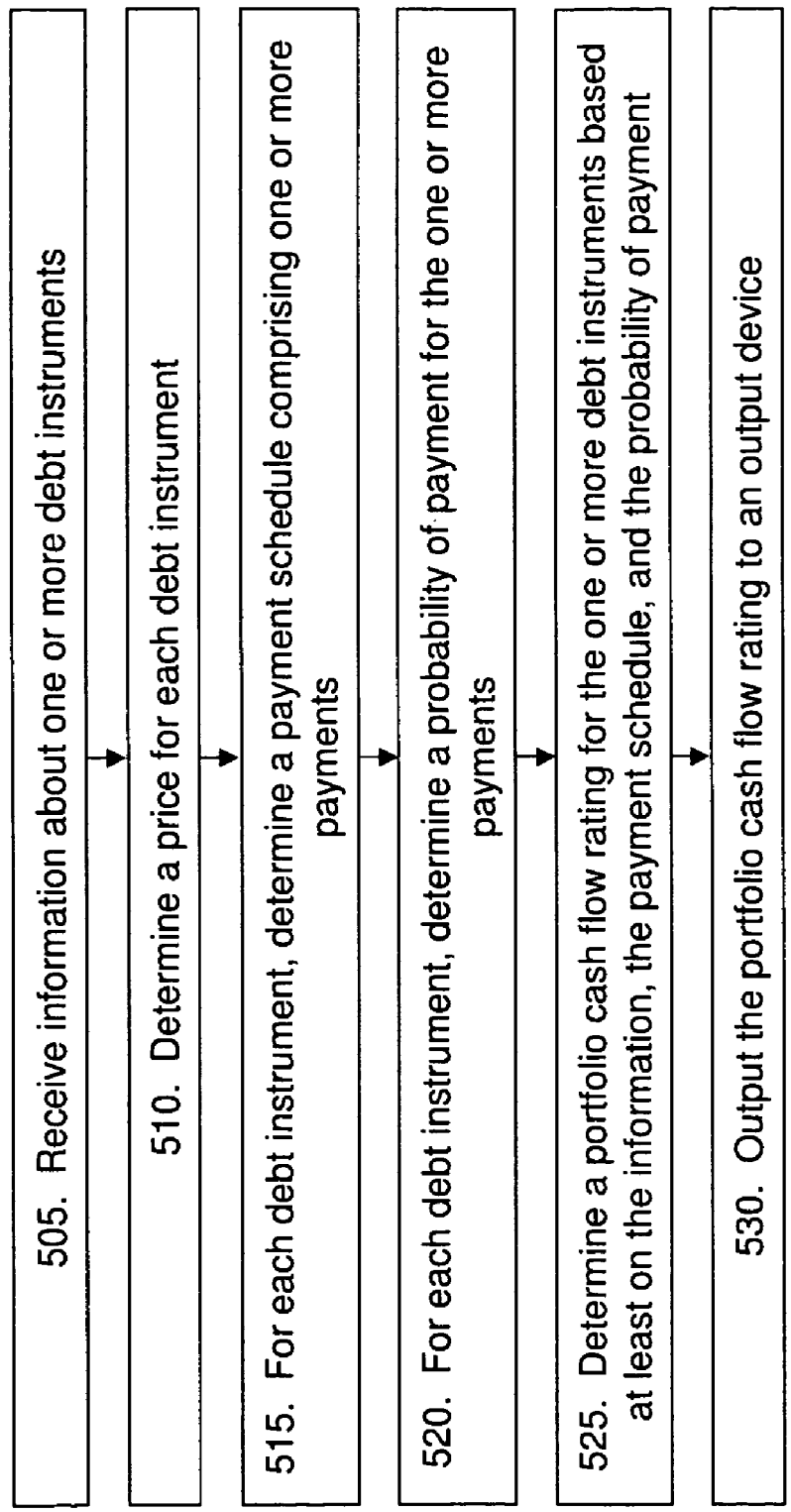
FIG. 5 depicts a flow diagram according to at least one embodiment of the methods disclosed herein.

FIG. 5 depicts a flow diagram according to at least one embodiment of the methods disclosed herein.

In block 505, information about one or more debt instruments may be received, e.g., according to any of the methods described herein.

In block 510, a price for each debt instrument may be determined, e.g., according to any of the methods described herein.

In block 515, for each debt instrument, a payment schedule comprising one or more payments may be determined, e.g., according to any of the methods described herein.

In block 520, for each debt instrument, a probability of payment for the one or more payments may be determined, e.g., according to any of the methods described herein.

In block 525, determine a portfolio cash flow rating for the one or more debt instruments based at least on the information, the payment schedule, and the probability of payment.

In block 530, the portfolio cash flow rating may be output to an output device, e.g., according to any of the methods described herein.

Figure 6:
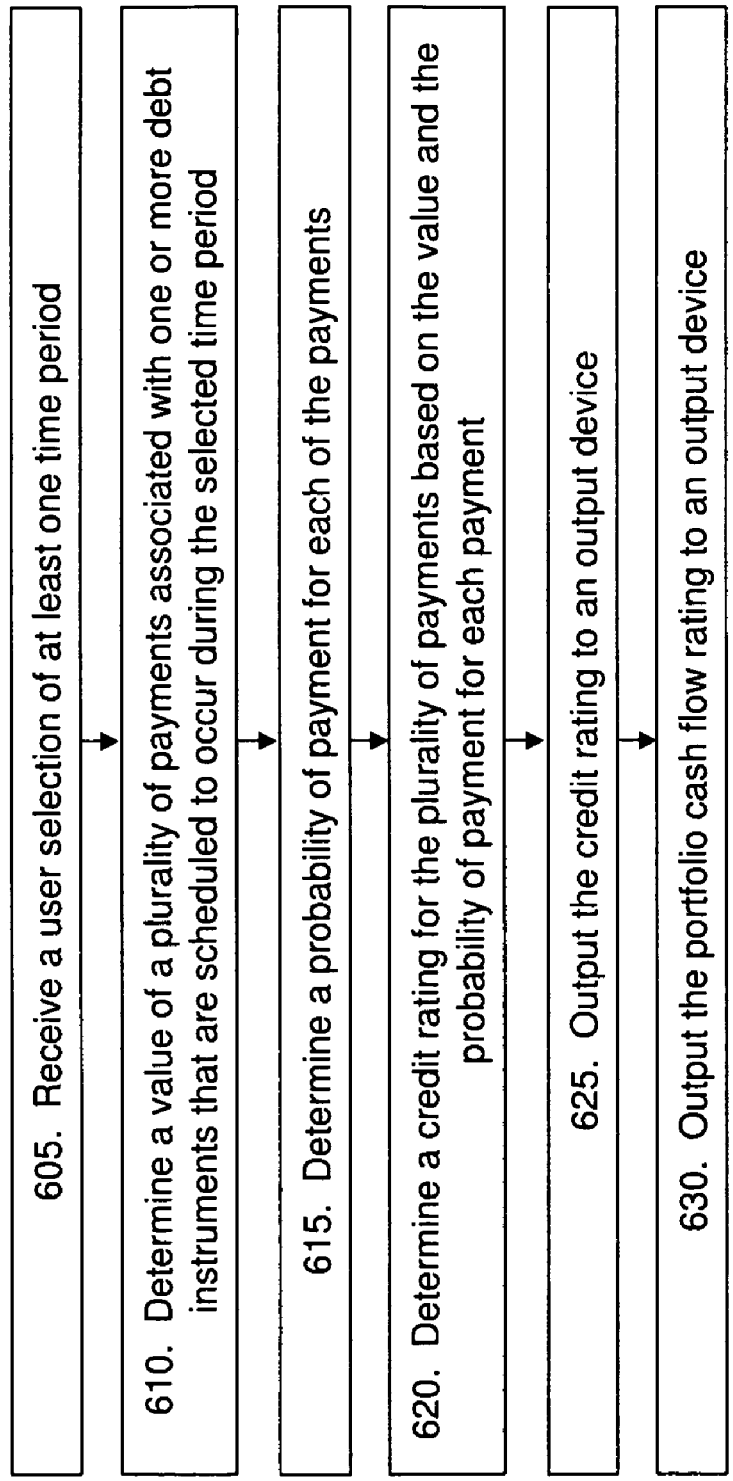
FIG. 6 depicts a flow diagram according to at least one embodiment of the methods disclosed herein.

FIG. 6 depicts a flow diagram according to at least one embodiment of the methods disclosed herein.

In block 605, selection of at least one time period may be received, e.g., from a user, e.g., according to any of the methods described herein.

In block 610, a value of a plurality of payments associated with one or more debt instruments that are scheduled to occur during the selected time period may be determined, e.g., according to any of the methods described herein.

In block 615, a probability of payment for each of the payments may be determined, e.g., according to any of the methods described herein.

In block 620, a credit rating for the plurality of payments may be determined based on the value and the probability of payment for each payment, e.g., according to any of the methods described herein.

In block 625, the credit rating may be output to an output device, e.g., according to any of the methods described herein.

In block 630, the portfolio cash flow rating may be output to an output device, e.g., according to any of the methods described herein.

FIG. 7 depicts an exemplary interface showing information associated with a selection of a time period for determining a cash flow rating according to at least one embodiment of the invention disclosed herein. In some embodiments, users 10 may interact with the interface of FIG. 7 to select one or more debt instruments (e.g., from a user's portfolio or from the open market) and one or more time periods corresponding to the one or more debt instruments for purposes of determining information such as one or more probabilities of payment, a payment cash flow rating, and an aggregate cash flow rating for all of the selected payments and debt instruments. The interfaces described in the present invention (e.g., in FIGS. 7-9) may be presented at a display, such as a touch-sensitive display, at a webpage, or other interface described herein or known in the art.

As shown in FIG. 7, title and account information 710 indicates account information such as the name of the accountholder, the account number, and a particular portfolio in the account (e.g., for users who have more than one portfolio in an account). Select debt instrument window 720 enables users to select a specific debt instrument 730 and 740 (or plurality of debt instruments) for which a time period may be selected. Here, the user has selected Debt Instrument A 730, and a payment schedule 750 for debt instrument A is displayed. The payment schedule may comprise a list of dates 765 and a list of payments 770 (e.g., payment 1 on date A1). The list of payments may be synchronized to the list of dates, such that the dates and payment dates match along an axis such as the y-axis. Here, Dec. 31, 2010 is at the same height at payment 1 on date A1, indicating that date A1 is the same as (or very close to) Dec. 31, 2010.

Two sets of sliders 780 are also shown in FIG. 7. A user 10 may adjust a set of sliders to "encircle", surround, or otherwise select specific payments and/or payment dates. Here, a user 10 has adjusted the top pair of sliders (e.g., by touching a touch-sensitive screen, selecting a slider with a mouse and moving it, etc.) to "encircle" the payments 2-5. The interface may highlight the selected payments in bold (or show another color, highlight, or other formatting indicia), and also provide an selecting indicia such as an arrow 790 to indicate the area selected by the sliders. A user may request to select another time period by selecting the select another period button 760, which may activate another pair of sliders 780. Here, user 10 has selected payment 8 (P8) using the bottom pair of sliders 780.

FIG. 8 depicts an exemplary user interface showing information associated with a determination of a cash flow rating according to at least one embodiment of the invention disclosed herein. Here, FIG. 8 may show cash flow rating information based on the user portfolio and selections using the interface shown in FIG. 7. As shown in FIG. 8, user account information 805 may be displayed together with an identification of the time period(s) selected for determining a cash flow rating. A portfolio cash flow rating for the selected payments of debt instruments A and B may be shown in window 815. The portfolio cash flow rating may be determined based on cash flow rating information determined for each payment. Windows 820 and 855 display cash flow rating information for debt instrument A and B, respectively, in user's portfolio, including, e.g., volume/quantity of units of the debt instrument, a purchase price (e.g., and/or net purchase price or net present value of purchase price; price may be expressed per unit), current market price (e.g., per unit).

Windows 820 and 855 may also display various information for debt instruments A and B, respectively, as described below. Selected payments window 850, 860 may display selected payments and dates, e.g., that were selected using the interface in FIG. 7. Discount rate window 825, 865 may display an applicable discount rate used to discount the value of the payment, e.g., to a present value. Present value window 830, 870 may display the present value of the applicable payment. The present value may be determined using conventional methods based on a future value and a discount rate (e.g., using the equation Future Value (t)=Present Value*(1+r)^t, or Present Value=Future Value (t)*(1−Discount Rate)^t, or another applicable equation). Discount rates may be different for different time periods, e.g., different amounts of time from the present. Likelihood of payment window 835, 875 may display a probability of payment for each payment, e.g., as determined using any methods described herein. Expected Present Value window 840, 880 may display an expected present value of each payment, as reduced by a discount rate and further reduced based on a less-than-100% probability of payment. For example, as shown in window 840, a present value of the second payment of debt instrument A ($PVA2) may be determined to be the Present Value of payment A2 times the probability of payment of payment A2. Payment Cash Flow Rating windows 845, 885 may display a cash flow rating for each payment, e.g., determined as described herein. Aggregate cash flow rating windows 850, 890 may display an aggregate cash flow rating for each debt instrument. For example, the rating in 850 may comprise a rating for the selected payments of instrument A determined based on the individual cash flow ratings of each payment selected for instrument A. This rating may comprise an average, e.g., an average weighted based on the present value of the respective payment or the expected present value of the respective payment.

FIG. 9 shows an exemplary diagram showing probability of payment versus time according to an exemplary embodiment of the invention. FIG. 9 shows a probability of payment versus time diagram for exemplary debt security ABC. FIG. 9 shows a determined probability of payment for six payments P1-P6 that are paid at times T1-T6, respectively. For example, payments 1-6 may be six $1000 payments made every three months from a present time. The diagram may be output to users to indicate a cash flow rating (or information relating to a cash flow rating) for payments on a debt instrument.

As shown in FIG. 9, the probability of payment at time t=T1 is slightly less than 1 (i.e., 100%), indicating a high probability of payment at the time of the first payment P1 (i.e., approximately 93% probability of payment at time t=T1). The probability decreases to around 48% at time t=T6, indicating a much lower probability that the sixth payment will be paid.

In some embodiments, a cash flow rating may be indicated for each payment. As shown in FIG. 9 underneath the x-axis, a cash flow rating of "AA" (a very good rating) is shown for the first payment (wherein "CR1" stands for "cash flow rating of payment 1") and a rating of "F--" (a very bad rating) for the fifth payment. As shown in FIG. 9, an aggregate cash flow rating for payments 1-5 is shown to be "D", which is between AA and F--. The "D" rating may correspond to an aggregate assessment of the likelihood that the six payments will be paid. Here, "D" may be a type of "average" probability, which may be calculated as described herein or as known in the art (e.g., by weighting each probability in the average according to the present value of the associated payment). As shown in FIG. 9, in some embodiments a present expected value of payments may be shown. Here, a present expected value of payments 1-6 is shown to be 4.2 times the value of P1 (e.g., 4.2*$1000=$4200). In some embodiments, the present expected value may be a measure of the expected value of payments 1-6, discounted according to the probability of receiving each payment. In some embodiments, a cash flow rating may be determined based on a comparison of this expected present value and the current market price of the debt instrument (or more specifically, the current market price of payments 1-6). For example, if the current market price is less than the expected payments, then payments 1-6 may have a high credit rating (such as 99 points, or AAA).

FIG. 10 shows an exemplary diagram showing a probability of payment versus an amount of a single payment according to an exemplary embodiment of the invention. The diagram may be shown at a user interface. Probabilities may be determined according to any method described herein. FIG. 10 shows different probabilities that different portions of payment #5 (e.g., a single $500 payment for debt instrument A at time t=5) will be paid. As known to those of skill in the art, less than a full amount of a payment may be paid in various circumstances, such as when an issuer defaults, liquidates, goes bankrupt, or other condition. For example, as shown in FIG. 10, there is a very high probability that 20% of payment #5 will be paid (e.g., approximately 97% probability), and a slightly lower probability (e.g., approximately 85% probability) that all 100% (i.e., all $500) will be paid. As shown in FIG. 10, an expectation value may be determined based on the various probabilities for the various portions of payment. The expectation value may be a probabilistic value of the payment (e.g., a measure of the area under the graph, wherein a value of 100% probability for all of the $500 payment would yield an expectation value of $500). In some embodiments, the diagram shown in FIG. 10 may comprise a cash flow rating or a portion of a cash flow rating.

It should be appreciated that various embodiments of the invention use some or all of the actions described in the blocks of FIGS. 1-10. The actions that are performed in those blocks may be performed in the order listed, or in any other order.

XIX. Alternative Technologies

It will be understood that the technologies described herein for making, using, or practicing various embodiments are but a subset of the possible technologies that may be used for the same or similar purposes. The particular technologies described herein are not to be construed as limiting. Rather, various embodiments contemplate alternate technologies for making, using, or practicing various embodiments.

Modifications, additions, or omissions may be made to the method without departing from the scope of the invention. The method may include more, fewer, or other steps. Additionally, steps may be performed in any suitable order without departing from the scope of the invention.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure, as defined by the following claims.

XX. References

The following patents and patent applications are hereby incorporated by reference herein for all purposes: U.S. Pat. No. 6,560,580; and U.S. patent application Ser. No. 09/801,495 filed Mar. 8, 2001, Ser. No. 10/301,527 filed Nov. 21, 2002, Ser. No. 10/699,858 filed Oct. 31, 2003, Ser. No. 11/122,510 filed May 4, 2005, and Ser. No. 12/189,266 filed Aug. 11, 2008.

What is claimed is:

1. An apparatus, comprising:

at least one processor; and a memory that stores instructions which, when executed by the at least one processor, directs the at least one processor to:

receive information about a debt instrument portfolio comprising one or more debt instruments, the information comprising, for each debt instrument, a price associated with the debt instrument in a database electronically coupled to the at least one processor;

determine a current market value for each of the one or more debt instruments, in which the market value for each debt instrument is different from the corresponding price associated with the corresponding debt instrument;

determine a payment schedule for each of the one or more debt instruments, each payment schedule comprising one or more payments, each payment schedule correlating a series of payment amounts with respective scheduled times of payment;

determine a probability of payment for the one or more payments for each of the one or more debt instruments;

after determining a probability of payment for the one or more payments for each of the one or more debt instruments, determine a portfolio cash flow rating of the debt instrument portfolio based on:

(1) the price of each debt instrument;

(2) the current market value of each of the one or more debt instruments; and (3) the probability of payment for the one or more payments of each debt instrument; and output the portfolio cash flow rating to an output device electronically coupled to the at least one processor.

2. The apparatus of claim 1, in which the one or more debt instruments comprises a plurality of debt instruments, in which the information comprises, for each debt instrument, a quantity of the debt instrument, and in which the act of determining a portfolio cash flow rating of the debt instrument portfolio comprises determining a portfolio cash flow rating of the debt instrument portfolio further based on the quantity of each of the one or more debt instruments.

3. The apparatus of claim 1, in which the instructions, when executed by the at least one processor, further direct the at least one processor to determine an expected net present value of the one or more payments, and in which the act of determining a portfolio cash flow rating of the debt instrument portfolio comprises determining a portfolio cash flow rating of the debt instrument portfolio further based on the expected net present value of the one or more payments of each debt instrument.

4. The apparatus of claim 1, in which the price of each respective debt instrument comprises a net investment amount, the net investment amount comprising an amount based on one or more amounts paid for the debt instrument by a current owner of the debt instrument less an amount based on any payments received on the debt instrument.

5. The apparatus of claim 4, in which the net investment amount comprises an amount based on the net present value of any amounts paid by the current owner for the one or more debt instruments less an amount based on the net present value of any payments received on the one or more debt instruments.

6. The apparatus of claim 1, in which the information about a debt instrument portfolio comprises, for each debt instrument, a par value of the debt instrument, in which the act of determining by the at least one processor a portfolio cash flow rating of the debt instrument portfolio is further based on the par value of each debt instrument.

7. The apparatus of claim 1, in which the act of determining a probability of payment for the one or more payments comprises determining a probability of payment for the one or more payments based on a determined market price for at least one of the one or more payments.

8. The apparatus of claim 7, in which the act of determining a probability of payment for the one or more payments based on a determined market price for at least one of the one or more payments comprises:

determining a market price for a specific one of the one or more debt instruments;

determining a futures price for the specific one of the one or more debt instruments, the futures price corresponding to a price after a specific payment on the specific debt instrument; and determining a current market price for the specific payment based on the market price for the specific debt instrument and the futures price for the specific debt instrument.

9. The apparatus of claim 1, in which the act of determining a portfolio cash flow rating of the debt instrument portfolio comprises determining the portfolio cash flow rating of the debt instrument portfolio based on an initial credit rating for each of the one or more debt instruments, each initial credit rating being determined for an issuer of the corresponding debt instrument before an issuance of the corresponding debt instrument.

10. The apparatus of claim 1, in which the act of determining a portfolio cash flow rating of the debt instrument portfolio comprises determining the portfolio cash flow rating of the debt instrument portfolio based on a current credit rating for each of the one or more debt instruments, each current credit rating being determined for an issuer of the corresponding debt instrument.

11. The apparatus of claim 1, in which the price associated with each of the one or more debt instruments comprises a value based on a price at which a current owner purchased each respective debt instrument.

12. The apparatus of claim 1, in which the portfolio cash flow rating comprises an assessment of a likelihood that the one or more payments will yield a positive return on a current owner's investment comprising one or more purchase prices associated with the one or more debt instruments.

13. The apparatus of claim 1, in which each debt instrument comprises a corporate bond.

14. The apparatus of claim 1, in which the current market value for each debt instrument comprises a current market price for each respective debt instrument.

15. The apparatus of claim 1, in which for each debt instrument, a price paid for the debt instrument comprises a price paid by a current owner of the debt instrument on a secondary market after issuance of the debt instrument.

16. The apparatus of claim 1, in which the instructions, when executed by the at least one processor, further direct the at least one processor to determine one or more hedge securities that would improve the cash flow rating of the debt instrument portfolio if the one or more hedge securities were added to the debt instrument portfolio.

17. The apparatus of claim 16, in which the instructions, when executed by the at least one processor, further direct the at least one processor to purchase the one or more hedge securities.

18. The apparatus of claim 17, in which the act of purchasing the one or more hedge securities comprises, for each hedge security, purchasing the hedge security in a volume determined by the at least one processor.

19. The apparatus of claim 16, in which the instructions, when executed by the at least one processor, further direct the at least one processor to determine a volume for each hedge security, in which one or more hedge securities would improve the cash flow rating of the debt instrument portfolio.

20. The apparatus of claim 16, in which the instructions, when executed by the at least one processor, further direct the at least one processor to:

prompt a user to identify one or more discretionary assets in the debt instrument portfolio;

sell at least one of the discretionary assets in exchange for an amount of proceeds;

purchase at least one of the hedge securities using at least a portion of the amount of proceeds.

21. The apparatus of claim 1, in which the act of determining a portfolio cash flow rating of the debt instrument portfolio comprises determining a portfolio cash flow rating of the debt instrument portfolio further based on a net present value of each price paid for each debt instrument.

22. The apparatus of claim 1, in which the act of determining a portfolio cash flow rating of the debt instrument portfolio comprises comparing (1) a net present value of all scheduled payments associated with the one or more debt instruments in the debt instrument portfolio with (2) a net present value of amounts paid for each debt instrument by a current owner of each debt instrument.

23. The apparatus of claim 1, in which the price of each respective debt instrument comprises a par value of the debt instrument.

24. The apparatus of claim 1, in which the one or more debt instruments comprises only a single debt instrument.

25. A method, comprising:
receiving by at least one processor a request to determine a cash flow rating of a plurality of debt instrument payments associated with at least one debt instrument scheduled over a time period, the request comprising a user selection of a time period corresponding to at least one payment of at least one of the at least one debt instruments, the at least one payment of the at least one debt instrument comprising a plurality of payments scheduled to occur during the selected time period;
determining by the at least one processor a present value of each of the at least one payments;
determining by the at least one processor a probability of payment for each of the at least one payments;
after determining a probability of payment for each of the at least one payments, determining by the at least one processor a cash flow rating of the selected at least one payments based on:
a price associated with each of the at least one debt instrument,
a market price associated with each of the at least one debt instrument, each market price being different from each corresponding price, and
the probability of payment of each of the one or more payments; and
transmitting the cash flow rating from the at least one processor to the user.

26. The method of claim 25, further comprising determining by the at least one processor a purchase price corresponding to at least one of the at least one debt instruments, in which the act of determining a cash flow rating of the selected at least one payments comprises determining by the at least one processor a cash flow rating of the selected at least one payments based on the probability of payment and purchase price.

27. The method of claim 26, further comprising determining by the at least one processor a net present value of the at least one payments, in which the act of determining a cash flow rating of the selected at least one payments comprises determining by the at least one processor a cash flow rating of the selected at least one payments based on the probability of payment and the net present value of each of the one or more payments.

28. The method of claim 27, in which the act of determining a cash flow rating comprises determining a cash flow rating of the selected at least one payments based on: a likelihood of default of at least one of the at least one debt instruments, the net present value of each of the one or more payments, and an initial credit rating of an issuer of the debt instrument determined before an issuance of the debt instrument.

29. The method of claim 25, wherein the request comprises a user selection of a beginning of the time period and an end of the time period.

30. The method of claim 25, further comprising determining a different time period of payments that would yield an improvement over the determined cash flow rating.

31. The method of claim 30, further comprising highlighting one or more payments in the different time period.

32. A method, comprising:
receiving by at least one processor a quantity and a purchase price associated with each of one or more debt instruments of a debt instrument portfolio, each of the one or more debt instruments having a schedule of payments comprising one or more payments;
determining by the at least one processor a probability of payment for the one or more payments of each of the one or more debt instruments;
after determining a probability of payment for the one or more payments of each of the one or more debt instruments, determining by the at least one processor a debt instrument portfolio cash flow rating for the debt instrument portfolio based on:
(1) the quantity and the purchase price associated with each of the one or more debt instruments;
(2) a current market price of each of the one or more debt instruments; and
(3) the probability of payment for the one or more payments of each of the one or more debt instruments;
transmitting the debt instrument portfolio cash flow rating from the at least one processor to a user;
determining by the at least one processor a quantity and a current market price associated with each of one or more hedge instruments of a hedge portfolio, the one or more hedge instruments having a probability of default that is inversely correlated to a probability of default of the one or more debt instruments;
determining by the at least one processor a collective cash flow rating for a collective portfolio comprising the debt instrument portfolio and the hedge portfolio, the collective cash flow rating indicating a higher likelihood of payment than the cash flow rating for the debt instrument portfolio; and
transmitting the collective cash flow rating and information about the hedge portfolio from the at least one processor to the user.

* * * * *